United States Patent
Alon et al.

(10) Patent No.: US 9,813,851 B2
(45) Date of Patent: Nov. 7, 2017

(54) CHECKPOINT SYSTEM AND PROCESS

(71) Applicant: CASE GLOBAL, INC., Los Angeles, CA (US)

(72) Inventors: Moshe Alon, Encino, CA (US); Uri Gal, Winnetka, CA (US)

(73) Assignee: CASE GLOBAL, INC., Los Angeles, CA (US)

( * ) Notice: Subject to any disclaimer, the term of this patent is extended or adjusted under 35 U.S.C. 154(b) by 0 days.

(21) Appl. No.: 14/457,629

(22) Filed: Aug. 12, 2014

(65) Prior Publication Data
US 2015/0050950 A1    Feb. 19, 2015

Related U.S. Application Data

(60) Provisional application No. 61/865,923, filed on Aug. 14, 2013.

(51) Int. Cl.
*H04W 4/02*    (2009.01)
*H04W 4/04*    (2009.01)

(52) U.S. Cl.
CPC ............. *H04W 4/02* (2013.01); *H04W 4/021* (2013.01); *H04W 4/028* (2013.01); *H04W 4/043* (2013.01)

(58) Field of Classification Search
CPC ... H04L 67/06; H04L 63/0428; H04L 63/126; H04L 67/04; H04L 12/583; H04L 12/5835; H04L 12/5895; H04L 2209/805; H04L 51/063; H04L 51/066; H04L 63/0861; H04L 67/322; H04L 9/0866; H04N 2201/3278

See application file for complete search history.

(56) References Cited

U.S. PATENT DOCUMENTS

| | | | | | |
|---|---|---|---|---|---|
| 2006/0232406 | A1* | 10/2006 | Filibeck | ............. | G08B 13/2462 340/572.1 |
| 2010/0238019 | A1* | 9/2010 | Richman | .......... | G08B 13/19656 340/521 |
| 2012/0315877 | A1* | 12/2012 | Lewis | ..................... | G01S 19/17 455/411 |
| 2013/0303085 | A1* | 11/2013 | Boucher | ............... | H04W 12/06 455/41.1 |
| 2014/0167963 | A1* | 6/2014 | Ferragne | ............ | G08B 13/2462 340/572.1 |

(Continued)

FOREIGN PATENT DOCUMENTS

SG    WO 2006075970 A1 *    7/2006    ............ F41C 33/029

*Primary Examiner* — Hirdepal Singh
(74) *Attorney, Agent, or Firm* — Foley & Lardner LLP

(57) ABSTRACT

A checkpoint system includes a plurality of checkpoint tags, each checkpoint tag located at a different checkpoint location. Each checkpoint tag has a storage device storing a checkpoint tag identification code. The system includes at least one mobile processor device that reads the checkpoint tags when the mobile processor device is brought within a predefined vicinity of the checkpoint location, and obtains location information corresponding to the location of the mobile processor device when the mobile processor device reads a checkpoint tag. The mobile processor device is configured to transmit data corresponding to the checkpoint tag identification code, location information and other information over the communication network to a backend or other processor device, in accordance with rule-base processes.

30 Claims, 6 Drawing Sheets

(56) References Cited

U.S. PATENT DOCUMENTS

| | | | |
|---|---|---|---|
| 2014/0278650 A1* | 9/2014 | Bagheri | G06Q 10/063116 705/7.16 |
| 2014/0337080 A1* | 11/2014 | Jackson | G06Q 10/1095 705/7.19 |
| 2014/0347193 A1* | 11/2014 | Ljung | H04L 67/04 340/870.01 |
| 2014/0351495 A1* | 11/2014 | Yoon | G06F 11/08 711/103 |
| 2015/0035645 A1* | 2/2015 | Gaddam | G07C 9/00111 340/5.61 |
| 2015/0038171 A1* | 2/2015 | Uilecan | G06Q 10/109 455/456.3 |
| 2015/0160328 A1* | 6/2015 | Peinhardt | G01S 5/0036 455/456.3 |
| 2016/0021091 A1* | 1/2016 | Hoyer | H04W 12/06 726/9 |

* cited by examiner

| Schedule | Personnel ID |
| --- | --- |
| 1 | A72XXX |
| 2 | A85XXX |
| ⋮ | ⋮ |
| N | AXXXXX |

Fig. 4

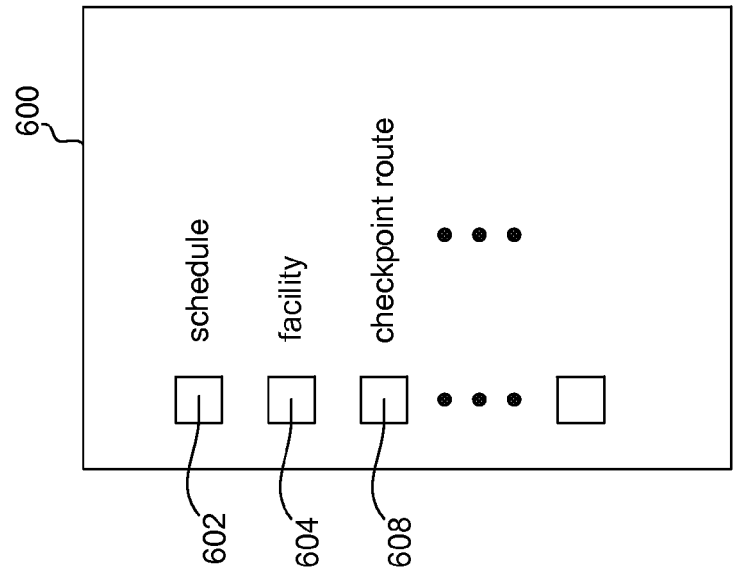

CHECKPOINT SYSTEM AND PROCESS

CROSS-REFERENCE TO RELATED PATENT APPLICATIONS

This application claims priority from Provisional U.S. Application 61/865,923, filed Aug. 14, 2013, which is incorporated herein by reference in its entirety.

BACKGROUND OF THE INVENTION

Embodiments of the present invention relate generally to checkpoint systems and methods and, more particularly, to systems and methods for recording or tracking information relating to checkpoints.

There are many contexts in which human interaction or a human's point of view is desired to provide a particular service or function. For example, in the context of security, it is often desirable for human security personnel to handle certain tasks and make appropriate evaluations and decisions, based on environmental or social conditions. Security personnel are often called upon or otherwise encounter situations in which human decision making and human interaction with other people is required. While security systems and processes are appropriate examples of contexts in which human interaction can be important, a human presences can be an important aspect of other types of systems and processes including, but not limited to, medical environments (in which the presence of a doctor or other medical technician may be important), teaching and counseling environments (in which the presence of a teacher or counselor may be important), research and technology development environments (in which the presence of an engineer or lab technician may be important), inventory and package tracking (in which the presence of a human to count or otherwise evaluate inventory, shipping instructions, or the like may be important).

In various systems and processes as mentioned above, it may be desirable for one or more human personnel to visit or check multiple items or locations over a period of time. For example, in the context of a security system or process, one or more designated security personnel may be assigned the task of visiting various locations to check on (or otherwise evaluate) the security and safety of those locations. A security guard may be given a route having multiple checkpoints along the route that the security guard is to visit, for example, during a preset time interval or at pre-designated times or dates.

In a similar context, a doctor or other medical personnel may arrange a route having multiple checkpoints where, at each checkpoint, the doctor or medical personnel is to see a patient and/or evaluate certain patient medical data. Similarly, in the context of research or development, an engineer or lab technician may be assigned the role of checking on the activity of certain processes or experiments (such as, but not limited to chemical reactions occurring in certain test tubes or other laboratory containers, the progress of growth of certain crystalline structures, the biological reaction of certain biological entities, or other checkpoints. Similarly, in the context of inventory or shipping, certain personnel may be assigned a list of checkpoints at which they are to count (or otherwise evaluate) inventoried items and/or to pick up or deliver items.

The above examples are just a few contexts in which checkpoints may be beneficial. To help explain aspects of the invention, various embodiments of the invention are described herein in the context of security systems and processes. However, other embodiments apply to other contexts (including, but not limited to those noted above) and need not be limited to security environments.

BRIEF DESCRIPTION OF THE DRAWINGS

FIG. 4 is a diagram showing a relationship of schedules with personnel ID codes;

FIG. 5 is a diagram showing an example of a checkpoint schedule;

FIG. 6 is a diagram representing a menu display;

DETAILED DESCRIPTION OF PREFERRED EMBODIMENTS

Figure 1:
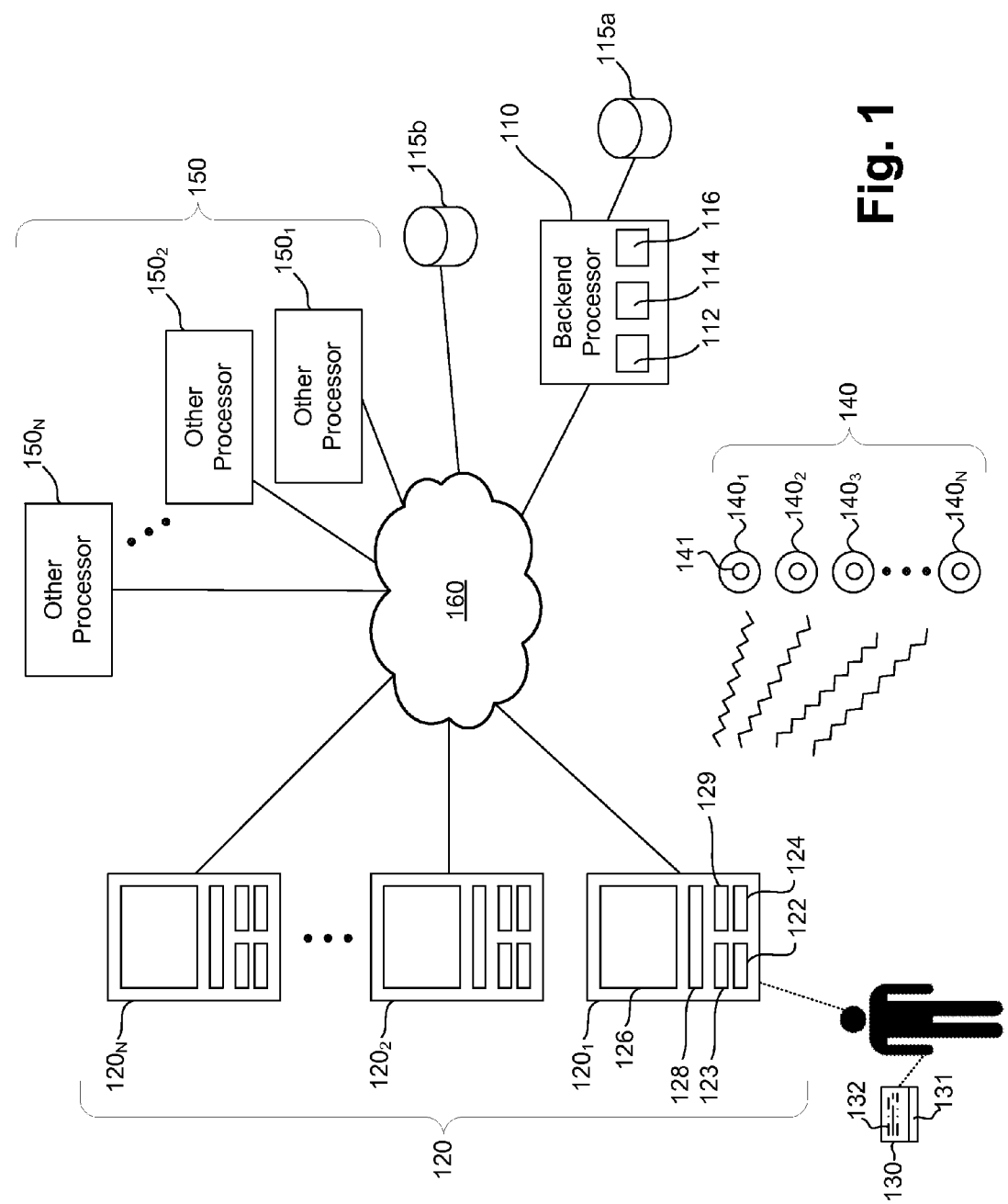
FIG. 1 is a block diagram of a system according to an embodiment of the invention.

In the following description of preferred embodiments, reference is made to the accompanying drawings which form a part hereof and in which are shown by way of illustration specific embodiments in which the invention may be practiced. It is to be understood that other embodiments may be utilized and structural changes may be made without departing from the scope of the preferred embodiments of the present disclosure.

Embodiments of the present invention relate to checkpoint systems and processes for recording or tracking information relating to checkpoints. A checkpoint system and process can detect and/or record the presence of one or more designated personnel at one or more designated checkpoint locations. In particular embodiments, a checkpoint system and process involves arranging a plurality of checkpoint tags at a corresponding plurality of checkpoint locations within a service area (an area in which the system or process operates to provide a checkpoint service). Each checkpoint tag contains pre-stored information and/or can receive and store further information before or after the tag is placed at a checkpoint location.

In particular embodiments, schedules (of checkpoint locations, times, and/or other information) are generated and assigned to designated personnel associated with mobile processor devices. The designated personnel (carrying their associated mobile processor devices), travel to checkpoint locations on their respective schedules, at the times specified in their respective schedules. In particular embodiments, the personnel perform predefined tasks at some or each checkpoint location and/or at other locations between, before or after checkpoint locations.

When a person with a mobile processor device is present within a checkpoint location and sufficiently proximate to a checkpoint tag at that checkpoint location, the mobile processor device is able to read information from the checkpoint tag. The information read by the mobile processor device is stored, transmitted to a backend or other processor device, and/or processed by the mobile processor device. In particular embodiments, other information is stored, transmitted and/or processed by the mobile processor device, including, but not limited to, sensor information (from sensors onboard or otherwise associated with the mobile processor device), location information (from location detection electronics onboard or associated with the mobile processor device), user-input information received from the person associated with the mobile processor device, or the like.

In embodiments in which the mobile processor device transmits such information to the backend processor device or other processor device, other personnel (such as, but not limited to supervisors, managers or other designated personnel) associated with the backend or other processor device that receives the information can perform tasks based on that information, such as, but not limited generating or updating schedule information, providing warning or other messages to personnel associated with one or more of the mobile processor devices, transmitting specified pre-stored information, obtaining and transmitting instantaneous sensor or detector information, contacting emergency or other designated personnel, or the like. In further embodiments, the mobile processor device, backend processor device and/or other processor device are programmed or otherwise configured to perform one or more of such tasks.

Alternatively or in addition, one or more rule-based processes (e.g., software programs) employ that information to perform tasks, such as, but not limited to, generating or updating schedule information, providing warning or other messages to personnel associated with one or more of the mobile processor devices, transmitting specified pre-stored information, obtaining and transmitting instantaneous sensor or detector information, contacting emergency or other designated personnel, or the like. In particular embodiments, rule-based processes are configured and/or customized for a particular service and/or customer for which the service is provided. In further embodiments, rule-based processes can be updated, adjusted and assigned to personnel (and the mobile processor devices associated with such personnel), individually in groups. In yet further embodiments, the backend processor device or other processor device that receives information from mobile processor devices are configured to carry out some or all of the rule-based processes. Accordingly, systems and processes of embodiments of the present invention can be generally or specifically configured for particular services, customers or the like, and can be flexible and adjustable before and during operation.

Example embodiments relate to systems and processes that can be implemented with device hardware that resides in typical smart phones or other mobile telephone devices (as mobile processor devices), and typical desktop PC or Apple™ computer devices (as backend and other processor devices), having suitable processing capabilities, user interfaces and communication capabilities, when configured with suitable application software (or other software) to perform operations described herein. Thus, particular examples embodiments can be implemented, using processor devices that are often already present in many business and organization environments, by configuring such devices with suitable software processes described herein. Accordingly, such embodiments can be implemented with minimal additional hardware costs. However, other embodiments relate to systems and process that are implemented with dedicated device hardware (mobile process devices and/or backend processor devices) specifically configured for performing operations described herein.

Example embodiments relate to systems and processes that employ (as mobile processor devices) mobile phone devices or other suitable portable communications electronics that include hardware and software for communication operations (e.g. for telephone, text messaging, emailing and/or other communications) and other typical mobile phone operations, as well as hardware and software for providing checkpoint operations and functions as described herein. Hardware and/or software for checkpoint operations and functions may be incorporated in the mobile phone during manufacture of the mobile phone, for example, as part of the original manufacturer's configuration of the mobile phone. In further embodiments, such hardware and/or software may be added to a mobile phone, after original manufacture of the mobile phone, such as by, but not limited to, installing one or more software applications onto the mobile phone.

Particular embodiments of the present invention employ mobile phones, commonly referred to as smart phones, that have suitable processing, input and display capabilities in addition to telephone communication capabilities to perform operations described herein. However, further embodiments of the present invention may be implemented in any suitable type of mobile phone and/or other types of portable electronic communication devices, such as, but not limited to, electronic pad devices, laptop or other portable computer devices, or the like, when configured with hardware and/or software to perform operations described herein.

In particular embodiments of the present invention, some of the hardware and software already existing in the mobile phone for telephone communication and/or other typical mobile phone or smart phone processing operations (referred to herein as "existing" electronics), is also used in the systems and processes for checkpoint operations and functions as described herein. Such existing hardware and software includes, for example, one or more input devices (such as, but not limited to keyboards, buttons, touchscreens, cameras, microphones, environmental parameter or condition sensors), display devices (such as, but not limited to electronic display screens, lamps or other light emitting devices, speakers or other audio output devices), telephone and other network communication electronics and software, processing electronics, electronic storage devices and one or more antennae and receiving electronics for receiving various signals, e.g., for global positioning system (GPS) communication, wireless fidelity (WiFi) communication, code division multiple access (CDMA) communication, time division multiple access (TDMA), frequency division multiple access (FDMA), long term evolution (LTE) communication, frequency modulation (FM) communication, Bluetooth (BT) communication, near field communication (NFC), and the like.

Hardware System Environment

With reference to FIG. 1, a block diagram of a system 100 is shown in accordance with example embodiments of the present invention. The system 100 includes one or more backend processor devices 110, one or more mobile processor devices 120, one or more identification tags 130, and a plurality of checkpoint tags 140. The drawing in FIG. 1 shows one backend processor device 110, and a plurality of mobile processor devices 120 represented by reference numbers $120_1$, $120_2$ . . . , $120_N$ (where N represents any number greater than one). The drawing in FIG. 1 also shows a user (a person) 101 carrying one of the mobile processor devices $120_1$ and an identification tag 130.

In particular embodiments, the system 100 also includes or operates with one or more other processor devices 150 (where FIG. 1 shows N other processor devices 150 represented by reference numbers $150_1$, $150_2$ . . . , $150_N$). The other processor devices 150 include, but are not limited to, one or more service processors (processors associated with running a service with the system 100), customer processors (processors associated with customers using the service), other mobile processor devices, or the like. Each backend processor device 110, mobile processor device 120, and other processor device 150 is connected for communication over an electronic communication network 160. The backend processor device(s) 110, mobile processor device(s) 120, and other processor device(s) 150 are programmed or otherwise configured to operate and provide functions described herein.

In particular embodiments, the communication network 160 is a wide area communication network, such as, but not limited to, the Internet, or one or more Intranets, local area networks (LANs), ethernet networks, metropolitan area networks (MANs), combinations thereof, or the like. In particular embodiments, the communication network 160 represents one or more secure networks configured with suitable security features, such as, but not limited to firewalls, encryption, or other software or hardware configurations that inhibits access to network communications by unauthorized personnel or entities.

In particular embodiments, the backend processor device 110 is configured to provide one or more network sites (such as, but not limited to secure websites or web pages) that can be accessed over the network 160 by personnel 101 with mobile processor devices 120. The backend processor device 110 includes one or more electronic processors 112 and one or more electronic storage devices 114. In addition to (or as an alternative to) electronic storage device(s) 114, the backend processor device 110 may be operatively connected with one or more further data storage devices 115a and 115b, where data storage device 115a is connected to the backend processor device 110 without a network connection between those devices, while data storage device 115b is connected to the network 160.

In particular embodiments, the electronic databases 115a and 115b are capable of storing a greater amount of information and/or provide a greater level of security against unauthorized access to stored information, than the electronic storage device 114 in the backend processor 110 (or similar electronic storage device in the other processor devices 150 and mobile processor devices 120). The electronic databases 115a and 115b may comprise any suitable electronic storage device or system, including, but not limited to random access memory RAM, read only memory ROM, floppy disks, hard disks, dongles or other RSB connected memory devices, or the like.

The backend processor device 110 includes network communication and interface software, hardware or combinations thereof, for connection with and communication over the network 160. In particular embodiments, the back end processor device 110 also includes one or more display devices 116 and one or more input devices 118 that provide an interface for personnel (such as service entity employees, technicians or other authorized users) to access the system for service, monitoring, generating reports, communicating with mobile processor devices 120 or other processor devices 150, or the like. In particular embodiments, the backend processor device 110 comprises a desktop computer, mainframe computer, laptop computer, pad device, smart phone device or the like, configured with hardware and/or software to perform operations described herein.

The electronic processor 112 may include any suitable data processing device including, but not limited to a microprocessor or the like. The electronic storage device 114 may include any suitable device for storing software and data for controlling and use by the processor 112 to perform operations and functions described herein, including, but not limited to random access memory RAM, read only memory ROM, floppy disks, hard disks, dongles or other RSB connected memory devices, or the like. The display device 116 may include any suitable device that provides a human-perceptible visible signal, audible signal, tactile signal or any combination thereof, including, but not limited to a touchscreen, LCD, LED, CRT, plasma, or other suitable display screen, audio speaker or other audio generating device, combinations thereof, or the like. The input device 118 may include any suitable device that receives input from a user including, but not limited to one or more manual operator (such as, but not limited to a switch, button, touchscreen, knob, slider or the like), microphone, camera, image sensor, or the like.

Each mobile processor device 120 includes one or more electronic processors 122 and one or more electronic storage devices 124, one or more display devices 126 and one or more user input devices 128, such as, but not limited to those described above with respect to electronic processor 112, electronic storage device 114, display device 116 and input device 118 of the backend processor device 110. In particular embodiments, each mobile processor device 120 also includes suitable electronics 123 (hardware and/or software) for determining geographic location of the mobile processor device 120, such as, but not limited to a global positioning system (GPS) or other satellite positioning system, terrestrial positioning system, combinations thereof, or the like. Also in particular embodiments, each mobile processor device 120 includes timer electronics that provide time information for determining a time of day and/or for timing a time period. Alternatively or in addition, each mobile processor device 120 is configured to obtain such time information from the backend processor device 110, other processor device 150 or other source over the network 160.

The mobile processor device 120 also includes network communication and interface software, hardware or combinations thereof, for connection with and communication over the network 160. The network communication and interface software, hardware or combination thereof includes wireless receiver or transceiver electronics and/or software 129 that provides a wireless communication link with the network 160 (or with a network-connected device). In particular embodiments, the wireless receiver electronics and/or software 129 operates with electronic processor(s) 122 for providing wireless telephone communication functions. In particular embodiments, the wireless receiver or input electronics and/or software 129 also operates with the electronic processor(s) 122 for receiving locally-generated wireless communication signals from signaling devices located within a specified proximity of the mobile processor device 120. In particular embodiments, the electronics and/or software 129 provides telephone and other communications in accordance with typical industry standards, such as, but not limited to code division multiple access (CDMA), time division multiple access (TDMA), frequency division multiple access (FDMA), long term evolution (LTE), wireless fidelity (WiFi), frequency modulation (FM), Bluetooth (BT), near field communication (NFC), and the like.

In particular embodiments, each mobile processor device 120 comprises a mobile smart phone (such as, but not limited to an iPhone™, an Android™ phone, or the like) or other mobile phone with suitable processing capabilities. Typical modern mobile phone devices include telephone communication electronics as well as some processor electronics, one or more display devices and a keypad or other user input device. Particular embodiments employ mobile phones, commonly referred to as smart phones, that have relatively advanced processing, input and display capabilities in addition to telephone communication capabilities.

However, the mobile processor device(s) 120 in further embodiments of the present invention may comprise any suitable type of mobile phone and/or other type of portable electronic communication device, such as, but not limited to, an electronic smart pad device (such as, but not limited to an iPad™), a portable laptop computer, or the like.

In embodiments in which the mobile processor device 120 comprises a smart phone or other mobile phone device, the mobile processor device 120 has existing hardware and software for telephone and other typical wireless telephone operations, as well as additional hardware and software 121 for providing checkpoint operations and functions as described herein. In such embodiments, some of that existing electronics hardware and software is also used in the systems and processes for checkpoint operations and functions as described herein.

In particular embodiments, one or more of the mobile processor devices 120 is configured with hardware and/or software to provide certain checkpoint tasks to be conducted by checkpoint personnel (such as, but not limited to, security guards, observers or other designated personnel) as part of a checkpoint schedule. Another one or more of the mobile processor devices 120 is configured to provide certain pre-defined further tasks (for example, but not limited to, tasks to be performed by a supervisor, manager or other designated personnel) as an alternative to or in addition to the checkpoint tasks.

Hardware and/or software 121 for checkpoint operations and functions may be incorporated in the mobile processor device 120 during manufacture, for example, as part of the original manufacturer's configuration of the mobile processor device. In further embodiments, such hardware and/or software 121 may be added to a mobile processor device, after original manufacture, for example, but not limited to, by loading one or more applications software onto the mobile processor device 120.

Each other processor device 150 comprises any suitable data processing device including such devices as described above with respect to backend processor device 110 and mobile processor device 120. Each other processor device 150 may be connected to operate with one or more electronic databases 115*a* and/or 115*b* and/or other similar electronic databases (not shown in FIG. 1).

Each identification tag 130 comprises a portable device that stores a first set of information that can be selectively read by input electronics or software 129 of the mobile processor device 120. In particular embodiments, the identification tag 130 comprises a card, name plaque, badge, emblem, or the like, that can be easily carried by personnel 101. In further particular embodiments, the identification tag 130 includes a coupling structure for coupling the identification tag to a person or to an article of clothing or other material carried by the person. Such coupling structure may include, but is not limited to, a clip, a pin, an adhesive (such as an adhesive coating, strip or tape), or the like. In particular embodiments, a plurality of identification tags 130 are issued or assigned to a corresponding plurality of authorized users 101, such that each user 101 is assigned a different and separate identification tag 130 relative to each other user.

Each identification tag 130 includes a data storage device 131 for storing at least some of the first set of information in the form of electronically readable data, such as, but not limited to, a coded magnetic strip, an electronic circuit chip, a bar code, a matrix code, combinations thereof, or the like. In particular embodiments, the data storage device 131 is passive and does not employ electrical power to hold data, once the data has been stored, such as, but not limited to magnetic storage devices. In further embodiments, the identification tag 130 also includes visually perceptible information 132, such as, but not limited to, printed text, photographs, drawings, combinations thereof or the like, that provide identification information relating to the user 101 to whom the identification tag 130 is issued or assigned.

In particular embodiments, each identification tag 130 contains electronically readable data and/or user perceptible data that includes unique identification information associated with a specific authorized person 101 to whom the identification tag 130 is issued or assigned. In such embodiments, each identification tag 130 contains electronically readable data and/or user perceptible data that is unique to a particular authorized person 101 and that is different from the data contained in other identification tags 130 issued or assigned to other authorized personnel 101. Such unique data may include, but is not limited to, a unique identification code associated with the person 101, the name and/or title of the person 101, an address (electronic or physical) associated with the person 101, or the like. In further embodiments, each identification tag 130 also contains further electronically readable data and/or user perceptible data that is not unique (that is common) to one or more other identification tags 130 issued or assigned to one or more other personnel. Such not unique (common) data may include, but is not limited to, a company name or indicia, organization or group name or indicia, facility name or indicia, title, rank, or the like. In further embodiments, each identification tag 130 contains other electronically readable data and/or user perceptible data.

In example embodiments, the identification tag 130 comprises a plastic, metal, paper or paperboard card that fits in a typical clothing pocket or that clips or otherwise attaches to an article of clothing, and includes an electronically readable magnetic strip 131 attached thereto. The magnetic strip containing a pre-recorded data corresponding to an identification code associated with a person 101 to whom the tag 130 is issued or assigned. In particular embodiments, the tag 130 *a* also contains at least one of printed text identifying the name of the person 101 and a photograph showing an image of the face of the person 101.

According to embodiments described herein, the plurality of checkpoint tags 140 (represented in FIG. 1 by reference characters 140$_1$, 140$_2$, 140$_3$ . . . 140$_N$) are configured to be arranged at a corresponding plurality of checkpoint locations within a service area. The service area may include, but is not limited to one or more shopping centers, malls, school campuses, corporate campuses, office buildings, warehouses, residential areas, business areas, cities, towns, counties, countries, portions thereof, combinations thereof, or the like.

The checkpoint tags 140 contains data corresponding to a second set of information. The data corresponding to the second set of information is pre-stored on each checkpoint tag 140 before the checkpoint tags are arranged at checkpoint locations. Alternatively or in addition, the checkpoint tags 140 are loaded with such data after (or at the time) that they are arranged at the checkpoint locations.

More specifically, each checkpoint tag 140 includes a data storage device 141 that stores data corresponding to the second set of information in a form that can be selectively read by the mobile processor device 120. The data storage device 141 may include any suitable device for storing electronically readable data, such as, but not limited to, a coded magnetic strip or other magnetic medium, an electronic memory circuit chip, a bar code, matrix code or other optically readable code, combinations thereof, or the like. In particular embodiments, the data storage device 141 is passive and does not employ electrical power to hold data, once the data has been stored, such as, but not limited to magnetic storage devices. Accordingly, the checkpoint tags 140 may be relatively inexpensive to manufacture.

Alternatively or in addition, one or more (or all) of the checkpoint tags 140 includes one or more active devices that employ electrical power to store and/or transmit data stored by the data storage device 141, receive and/or process data. Such active devices include, but are not limited to processors for processing data and transceivers, receivers and/or transmitters configured for wireless communication using wireless fidelity (WiFi), frequency modulation (FM), Bluetooth (BT), near field communication (NFC), and/or other suitable communication link with mobile processor devices 120. In further embodiments, one or more (or all) of the checkpoint tags 140 includes location detection electronics, such as, but not limited to GPS electronics, that provides location data representing the geographic location of the checkpoint tag 140. In those embodiments, the location data is stored in a readable format and/or transmitted by the checkpoint tag 140, using storage and active devices as described above.

In particular embodiments, the data storage device 141 is configured to permanently store a set of data in a manner that does not allow the stored data to be altered or written over. In other embodiments, the data storage device 141 is writable and configured to allow data to be added and stored, written over other stored data and/or altered, for example, through a communication link with a mobile processor device 120. In yet other embodiments, the data storage device 141 includes a first set of data (and/or a first storage area for storing a first set of data) that is permanently stored in a manner that does not allow it to be altered or written over, and a second set of data (and/or a second storage area for storing a second set of data) that can be altered, added to, and/or written over, as discussed above.

As discussed above, the checkpoint tags 140 are configured to be placed at checkpoint locations. In particular embodiment, each checkpoint tag 140 is arranged at a different and separate checkpoint location relative to each other checkpoint tag 140. In further embodiments, each checkpoint tag 140 includes coupling structure for coupling the checkpoint tag to physical structure (such as, but not limited to, a wall, a ceiling, a floor, a piece of furniture, a kiosk, a sign, a computer, a person, or other suitable physical structure) at a checkpoint location. Such coupling structure may include, but is not limited to, a clip, a pin, an adhesive (such as an adhesive coating, strip or tape), or the like.

With the checkpoint tags 140 arranged at checkpoint locations, one or more designated personnel 101 are each associated with a respective mobile processor device 120. Each designated person 101 is able to carry (hold or otherwise take) a mobile processor device 120 and travel to one or more of the checkpoint locations and, at each checkpoint location, place the mobile processor device 120 in sufficient proximity of a checkpoint tag 140 at that checkpoint location, to allow the mobile processor device 120 to scan or otherwise read or receive data from checkpoint tag 140, e.g., using magnetic, optical, or other suitable reading electronics in the mobile processor device 120 and/or wireless fidelity (WiFi), frequency modulation (FM), Bluetooth (BT), near field communication (NFC), and/or other suitable communication link with the checkpoint tag 140.

The scanned/read data is stored, processed and/or communicated by the mobile processor device 120. In particular embodiments, information corresponding to the scanned/ read data is communicated by the mobile processor device 120 to the backend processor device 130, over the communication network 160 or other communication link. In particular embodiments, the mobile processor device 120 is also configured to scan or otherwise read or receive data stored on the designated personnel's identification tag 130, for example, at a predefined time (such as, but not limited to, the time at which the designated personnel checks in or out for work, starts or stops a break period, initiates or ends a tour of checkpoint locations, or enters user-input information), or at each pre-designated checkpoint location.

Example Operation

Systems according to embodiments of the present invention are configured to provide checkpoint processes. In particular embodiments, a checkpoint process involves checking and/or recording the presence of one or more designated personnel at one or more designated checkpoint locations. In further embodiments, the checkpoint process involves checking and/or recording the presence of designated personnel and the time and/or date at which the designated personnel were present at the designated checkpoint location(s). In yet further embodiments, the checkpoint process involves additional operations associated with checking and/or recording the presence of designated personnel, such as, but not limited to, providing notices, warnings or other messages relating to a time, time period and/or location at which the designated personnel is scheduled to be present.

While further embodiments of the invention relate to checkpoint systems and processes for other types of services and activities, example embodiments are described herein with respect to a security service for a shopping mall or other facility having one or more structures, buildings, units, rooms, lots, zones or other definable areas that serve as or contain checkpoint areas. Particular embodiments of a checkpoint system and process are configured for a security service, where one or more designated personnel (such as security guards, observers, or the like) are scheduled to be present at designated checkpoint locations, at designated times or over a designated period of time, and provide security services at each checkpoint location. The security service at a given checkpoint location may include, but is not limited to, for example, observing the environment (zone or area) in the vicinity of the checkpoint location for possible security problems, checking in with other personnel at the checkpoint location, or checking the status or condition of a person or device at or near the checkpoint location (e.g., obtaining visual or audible information from a person, checking the operation of a machine, checking the value shown on a gauge, screen or other indicator, or the like).

Figure 2:
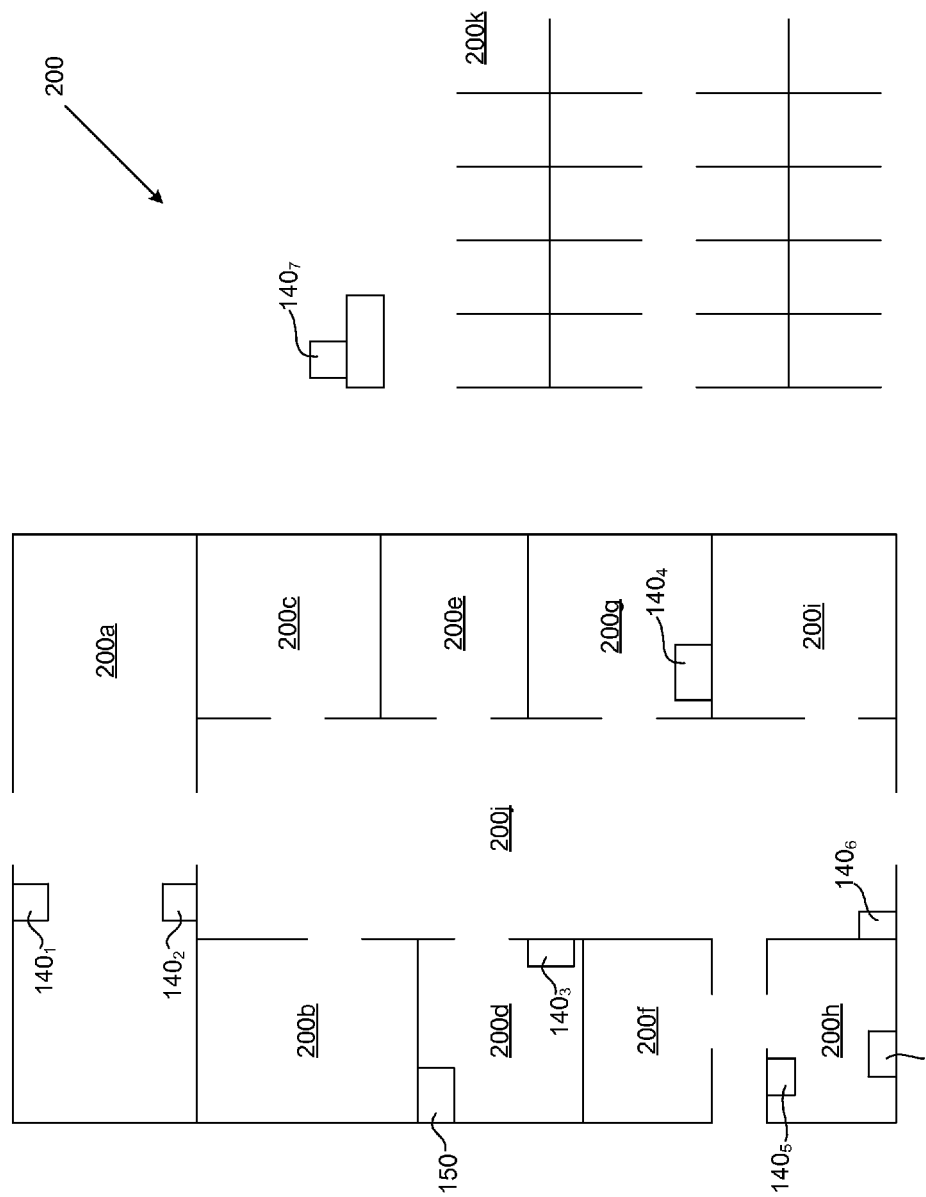
FIG. 2 is a diagram representing a map of a shopping mall facility in which a system and a process according to an embodiment of the invention is employed.

The diagram in FIG. 2 represents a map or plan view of a facility 200, such as a shopping mall, in which a checkpoint system according to an embodiment of the present invention is employed. However, the drawing in FIG. 2 could, alternatively, represent one or more other types of facilities having a plurality of different definable areas, including, but not limited to one or more school campuses, corporate campuses, office buildings, warehouses, residential areas, business areas, cities, towns, counties, countries, portions thereof, combinations thereof, or the like.

The shopping mall facility 200 includes a plurality of different definable areas (such as, but not limited to stores, utility rooms, hallways, stairwells, or other indoor or outdoor areas), represented in FIG. 2 as areas 200*a*-200*j*. In the embodiment of FIG. 2, at least one of those areas (i.e., area 200*h*) comprises an office for security or other personnel involved in the business operations of the shopping mall. Also in the embodiment of FIG. 2, at least one of those areas (i.e., area 200*j*) is an outdoor area such as, but not limited to a parking lot, sitting area, park or other outdoor area associated with the shopping mall.

In particular embodiments, the backend processor 110 of the system 100 is located in the security office (in area 200*h*) of the shopping mall facility 200. In other embodiments, the backend processor 110 is located at a different location in or remote from the shopping mall facility 200. In particular embodiments, the other processor devices 150 include one or more customer processors located at one or more of the stores within the shopping mall facility 200. In further embodiments, the other processor devices 150 include one or more processor devices located in or remote from the shopping mall facility 200 and associated with a police agency, a fire agency, ambulance or other emergency agency, a hospital or other medical facility, a designated expert or consultant, or the like. The backend processor 110 and the other processor devices 150 shown in FIG. 2 are connected for communication over the network 160, as described above with respect to FIG. 1.

According to embodiments of the present invention, one or more security personnel are provided with a schedule of designated locations within the shopping mall facility 200 to visit and make appropriate observations and/or perform other specified functions. The designated locations include one or more checkpoint locations and, in some embodiments, include other locations (locations that are not checkpoint locations). At least one checkpoint tag 140 is arranged at each checkpoint location.

Thus, in the example shown in FIG. 2, a separate checkpoint location (and at least one different and separate checkpoint tag 140) is provided in each of the different areas 200*a*, 200*d*, 200*g*, 200*h*, 200*j* and 200*k*, but not in the areas 200*b*, 200*c*, 200*e*, 200*f* or 200*i*. More specifically, two checkpoint tags $140_1$ and $140_2$ are provided in area 200*a*, one checkpoint tag $140_3$ is provided in area 200*d*, one checkpoint tag $140_4$ is provided in area 200*g*, one checkpoint tag $140_5$ is provided in area 200*h*, one checkpoint tag $140_6$ is provided in area 200*j*, and one checkpoint tag $140_7$ is provided in area 200*k*. Thus, in the embodiment of FIG. 2, some of the definable areas 200*a*-200*k* of the shopping mall facility 200 include one or more checkpoint locations (a designated area at or near a checkpoint tag 140), while other definable areas of the shopping mall facility 200 do not include checkpoint locations. Each schedule assigned to the security personnel includes one or more checkpoint locations and, in some embodiments, also includes one or more other locations (not checkpoint locations) within definable areas 200*a*-200*k* of the shopping mall facility 200.

The checkpoint tags 140 may be affixed to a suitable structure at the checkpoint location (where the structure may comprise, but is not limited to, one or more of a wall, ceiling, floor, post, piece of furniture, personnel, computer or other equipment at the checkpoint location). In particular embodiments, each checkpoint tag 140 is configured to be relatively inconspicuous or hidden from view, when affixed at the checkpoint location. For example, each checkpoint tag 140 may be adhered to the surface of a wall, the side of a desk or other location that is known to and accessible by the designated personnel, but is relatively inconspicuous to others.

As discussed above, each checkpoint tag 140 includes a data storage device 141 that stores data readable by a mobile processor 120. The data stored in the data storage device 141 of each checkpoint tag 140 may be pre-stored, e.g., during manufacture of the tags 140 or setup of the system 100. Pre-stored data may include, but is not limited to, an identification code associated with the checkpoint tag 140. In particular embodiments, each checkpoint tag 140 stores an identification code that is unique and different with respect to the identification code stored in each of the other checkpoint tags 140 in the system 100.

In particular embodiments, at least some (or all) of the data stored in data storage device 141 of each checkpoint tag 140 is written into (and stored on) the data storage device 141 of the checkpoint tag 140, after (or at the time that) the checkpoint tag 140 is disposed at a checkpoint location. In such embodiments, one or more of the mobile processor devices 120 (or other processor device 150) is configured to write data into one or more of the checkpoint tags 140, after the checkpoint disposed at a checkpoint location (or at the time that the checkpoint tag is disposed at the checkpoint location). In particular embodiments, the one or more mobile processor devices 120 (or other processor device 150) that are configured to write data one checkpoint tags 140 are associated with certain designated personnel (such as, but not limited to supervisors, managers, designated security service customers, or other personnel authorized to write information into checkpoint tags).

Thus, for example, as part of an initial system set up procedure, one or more designated personnel may be authorized to install checkpoint tags 140 at one or more designated checkpoint locations in a facility. At the time of installing each checkpoint tag 140 (or after installation), the same or other designated personnel may perform an initializing function. In particular embodiments, the initializing function involves associating each respective checkpoint tag 140 with a respective checkpoint location, and storing data corresponding to that association. Examples of initial system setup procedures are described, below, as Initial System Setup Examples.

Once the checkpoint tags 140 are disposed at checkpoint locations and the checkpoint tag locations are initialized, the checkpoint tags 140 may be read by security personnel associated with the mobile processor devices 120. As described herein, each security person has (or is provided with) a separate mobile processor 120 and carries that mobile processor to each checkpoint location on the security person's schedule. At each checkpoint location, the security person places the mobile processor 120 in sufficiently close vicinity to the checkpoint tag 140 at that location, to read data stored on the data storage device 141 of that checkpoint tag. The data is read from the checkpoint tag's data storage device 141 by a wireless coupling of the mobile processor device 120 with the checkpoint tag 140. Such wireless coupling and data reading may be accomplished by any one or more of, but not limited to, magnetic, optical, or other suitable reading electronics in the mobile processor device 120 and/or wireless fidelity (WiFi), frequency modulation (FM), Bluetooth (BT), near field communication (NFC), and/or other suitable communication link with the checkpoint tag 140.

In particular embodiments, the wireless coupling occurs automatically, when the mobile processor device 120, operating the system software, is brought to the checkpoint location and within a sufficiently close proximity to the checkpoint tag 140 to read or otherwise receive data from the checkpoint tag 140. In other embodiments, the person associated with the mobile processor device 120 must activate an operator, e.g. through an input device 128 on the mobile processor device 120, to cause the mobile processor device 120 to read or otherwise receive data from the checkpoint tag 140, when the mobile processor device 120 is within the sufficient proximity of the checkpoint tag 140.

In other embodiments, the wireless coupling requires the mobile processor device 120 to be in physical contact with, swipe or aim a magnetic, optical or other receiver of the mobile processor device 120 onto a portion of the checkpoint tag 140, to cause the mobile processor device 120 to read or otherwise receive data from the checkpoint tag 140. In yet further embodiments, a combination of such actions is required to read or otherwise receive data from the checkpoint tag 140.

In particular embodiments, at each checkpoint location (or other locations) additional information is obtained through one or more input devices of the mobile processor device 120. Such additional information includes, but is not limited to one or more of user-input information (e.g., obtained through a user input device 128 on the mobile processor device 120), sensor information (from sensors onboard or otherwise associated with the mobile processor device 120), and location information (from location detection electronics onboard or associated with the mobile processor device 120). For example, the security person may enter text data relating to an observation at the checkpoint location (e.g., entered through a keyboard, touchscreen or other text interface on the mobile processor 120), image data relating to a photograph, video or other image of or associated with the checkpoint location (e.g., taken with an image capture device on the mobile processor 120), audio data relating to sounds at or associated with the checkpoint location (e.g., picked up with a microphone or other audio input device associated with the mobile processor), or combinations thereof.

Thus, with embodiments of the system 100, various checkpoint processes can be carried out. In an example of a checkpoint process for a security service as described above, a security person (such as, but not limited to, a security guard or observer) initiates a checkpoint process by visiting the security office in area 200h. For example, at the beginning of a work shift, the security person may enter and check in at the security office in area 200h. The security person is issued a mobile processor device 120 at the security office (or brings a previously-obtained mobile processor device 120 to the security office). In addition, the security person is issued an identification tag 130 at the security office (or brings a previously-obtained security tag 130 to the security office). The mobile processor device 120 may be pre-configured with system hardware and/or software 121 and/or may be further configured with software 121 at the security office.

With the mobile processor device 120 configured with system hardware and/or software 121, the security person may, perform a checkpoint schedule process 300 as described with reference to FIG. 3. According to the checkpoint schedule process 300, the security person (e.g. person 101) obtains a schedule of checkpoint locations (per box 302). In one embodiment, the schedule is described in text and/or image information that is loaded onto the mobile processor device 120 from a computer (such as, but not limited to the backend processor 110) located at the security office, e.g., through a direct wireless communication link and/or a wired communication link between the mobile processor and that computer. In other embodiments, some or all of the information in the schedule is received by the mobile processor device 120, from another computer 150, over the network 160 and/or from checkpoint tags 140, as described herein. In particular embodiments involving multiple security personnel (such as, but not limited to, a plurality of security guards and/or security observers), each security person is provided a different schedule relative to each other security person. In other embodiments, two or more security personnel may be provided with the same schedule (for example, for performing team or redundant security functions).

In particular embodiments, each security person is provided a schedule that is associated with that security person. In such embodiments, the backend processor device 110 maintains data representing a plurality of different schedules and associations of each schedule with one or more security personnel. Data representing associations of schedules with personnel may be stored in any suitable electronic data storage device accessible by the backend processor device 110, including, but not limited to one or more of the data storage devices 114, 115a and 115b. In particular embodiments, a plurality of schedules are associated, on a one to one basis, with a corresponding plurality of personnel (personnel names, identification codes, and/or other identification information that has been pre-assigned to the personnel).

The table in FIG. 4 is an example of association 400 of schedules 1-N with a corresponding plurality of personnel, represented by personnel identification codes (where N represents an integer greater than 2). More specifically, the table in FIG. 4 includes a first column 402 of the schedules 1-N and a second column 404 of the identification codes associated with the schedules 1-N. Other embodiments may employ other formats for associating personnel with schedules. In the table in FIG. 4, schedule 1 is associated with personnel identification number A72XXX, while schedule 2 is associated with personnel identification number A85XXX and schedule N is associated with personnel identification number A12XXX. The association relationships of schedules with personnel (e.g., personnel identification codes) may be designated in advance, for example, by personnel associated with the entity operating the security service or other suitable personnel. Alternatively or in addition, some or all of the association relationships of schedules with personnel may be generated by an algorithm or other program running on a computer, such as, but not limited to the backend processing device 110.

Each security person receives the schedule associated with that security person. In particular embodiments each security person obtains their respective schedule by entering their personnel identification number (e.g, through their mobile processor device 120, or through another input device associated with the backend processor device 110). In particular embodiments, the security personnel enter their personnel identification number by manually entering text data through the input devices 128 of their respective mobile processor devices 120. In other embodiments, the security personnel enter their personnel identification number by scanning or otherwise reading data representing that number stored in the data storage device 131 on their respective personal identification tags 130, using scanning or other reading/input electronics on their respective mobile processor devices 120.

Thus, for example, when the security personnel checks in with the security office (for example, at the beginning of a work shift), the security personnel scan or otherwise enter their respective personnel identification codes (e.g., by scanning their identification tag 130) with their respective mobile processor devices 120. The mobile processor device 120, then, communicates the personnel identification number to the backend processor device 110 and receives the schedule associated with that personnel identification number from the backend processor device 110. In particular embodiments, the security personnel may check in and receive a schedule (e.g., to start the checkpoint process and/or to start recording work time for payroll calculations) simply by scanning an identification code on the identification tag 130, without requiring manual typing or writing of information.

Upon receiving a personnel identification number, the backend processor device 110 identifies the schedule associated with the personnel identification number (e.g., using a data relationship, such as, but not limited to the table in FIG. 4), and transmits schedule data to the mobile processor device 120 of the person corresponding to the personnel identification number. The mobile processor device 120 receives and stores the schedule data, for selective display on the display device 126. In particular embodiments, some or all of the schedule data for a given schedule is received from the backend processor device 110. In further embodiments, some or all of the schedule data is received from one or more other processor devices 150 over the network 160, and/or from one or more checkpoint tags 140 over a near field communication link (e.g., when the mobile processor device 120 of the security person associated with the schedule is present at the location(s) of the one or more checkpoint tags 140).

The schedule may be displayed on the display device 126 of a mobile processor device 120, in any suitable format. As an example to assist with the present disclosure, a schedule in the form of a table (with information arranged in rows and columns) is shown in FIG. 5. Other embodiments may employ other table formats or other non-table formats of schedule information, for display on the display device 126.

In particular embodiments, each schedule 1, 2 . . . N identifies one or more (e.g., a plurality of) checkpoint locations within a service area. The schedule may also identify one or more other locations (not checkpoint locations) within the service area and/or additional information. In particular embodiments, the additional information includes one or more of time information, action information and notices information.

The table in FIG. 5 is an example of a schedule 500, including N locations (where N represents an integer greater than 1). As discussed above, other embodiments may employ other formats for schedules (e.g., other table formats or non-table formats). Furthermore, other embodiments may employ some, but not all of the information (e.g., columns) shown in FIG. 5, and/or other information (e.g., other columns).

The example table in FIG. 5, shows a schedule 500 of locations 1-N, where each location is associated with a row in the table. The schedule in FIG. 5 includes location identification information (in a first or left-most column 502 of the table) that identifies each location. The location identification information may identify a location by use of a pre-defined checkpoint location identifier or code (e.g., CheckPt 1 to refer to a pre-defined location for checkpoint 1), a pre-defined name of an area (e.g., the name of a store in one of the areas 200*a-i*, Parking Lot A to refer to a particular parking lot, Maple Street entrance to refer to an entry point from Maple Street, etc.), a physical or geographic description of an area (e.g., south-west corner of parking structure, end of main hallway, etc.), geographic coordinates (e.g., corresponding to coordinates that can be obtained by electronics 123 of the mobile processor device 120), a drawing or photograph of an area, combinations thereof, or the like. The example table in FIG. 5 includes identification information shown as "CheckPt 1", "CheckPt 2", "Parking Lot A" and "CheckPt N" (corresponding to checkpoint 1, checkpoint 2, parking lot A and checkpoint N, respectively).

The table in FIG. 5 also includes time information (in a second column 504—the second column from the left side of the table) in the form of a time range associated with each location. The time information may identify one or more times, dates, time periods or time ranges, for example, with standard alpha-numeric symbols for times and/or dates. In particular embodiments, the time information represents one or more times, dates, time periods or date periods at which the security person associated with the schedule is scheduled to be present at each location associated with the time information on the schedule. In other embodiments, the time information represents one or more times, dates, time periods or date periods at which the security person associated with the schedule is scheduled to arrive, depart or conduct some other specified activity at each location associated with the time information on the schedule. Different time or date information is associated with each different location in each schedule, in a manner that allows the security person associated with a given schedule to travel to each location on that schedule by the time or date associated with that location.

In the example shown in FIG. 5, a time range associated with the location of checkpoint 1 (CheckPt 1) is the period of 7:45 a.m. to 8:00 a.m., the time range associated with the location of checkpoint 2 (CheckPt 2) is the period of 8:15 a.m. to 8:25 a.m., the time range associated with the location of checkpoint 3 (CheckPt 3) is the period of 8:30 a.m. to 8:40 a.m., and the time range associated with the location of checkpoint N is the period of 2:30 p.m. to 2:45 p.m. Thus, the security person associated with the schedule in FIG. 5 is scheduled to be present (or arrive at, depart from or conduct another specified activity) at checkpoint 1 (CheckPt 1) within the period of 7:45 a.m. and 8:00 a.m., at checkpoint 2 (CheckPt 2) within the period of 8:15 a.m. and 8:25 a.m., at checkpoint 3 (CheckPt 3) within the period of 8:30 a.m. to 8:40 a.m., and so forth. The time information shown in FIG. 5 are examples to assist with the present disclosure. Other embodiments may employ any one or more suitable time, date, time period or date period as the time information associated with the locations.

The table in FIG. 5 also includes action information (in a third column 506—the third column from the left side of the table) associated with one or more (or each) location in the schedule. The action information identifies one or more actions to be performed or to occur. In particular embodiments, the action information identifies one or more actions that are to be performed or to occur at or near the location associated with the action in the schedule. In further particular embodiments, the action information identifies one or more actions that are to be performed by the security person associated with schedule, for example, at or near the location associated with the action in the schedule. In particular embodiments, such actions include one or more of checking specified equipment or structure at or near the checkpoint location (for example, but not limited to, observing or otherwise checking readings on gauges, warning lights, display screens or other indicators on equipment at or near the location; observing, measuring or otherwise checking on the level of water or other substance in a reservoir or other vessel, observing or otherwise checking the on/off state of a machine, lights, fans or other equipment at or near the location, observing or checking on the open/close state of a door, window or other opening at or near the location, or the like). Alternatively or in addition, such actions may include meeting with a specified person at or near the location, or the like. In other embodiments, the action information represents other suitable actions, not limited to the actions described above.

The action information may describe one or more actions with the use of alphanumeric characters (e.g., a written description of or code associated with an action), drawings, photographs, videos combinations thereof, or the like. In particular embodiments, action information includes a selectable network link that allows the security person associated with the schedule to receive further action information (such as, but not limited to one or more written description, drawing, photograph, video, combinations thereof, or the like) from the backend processor device 110 and/or another processor device 150, over the network 160.

The table in FIG. 5 also includes notices information (in a fourth column 408—the fourth column from the left side of the table) associated with one or more (or each) location in the schedule. In particular embodiments, the notices information provides additional information that relates to the location associated with the notices information in the schedule. The notices information identifies one or more warning, instruction, message, information about a security or safety matter, combinations thereof, or the like. For example, a security information notice may provide a message to "be on the look out for" a particular person, item, activity, or the like, and may provide a description of that person, item or activity (such as, but not limited to a textual description, photograph and/or drawing of the person, item or activity). A safety information notice may provide a message to check certain safety equipment or structure, for example, a message to "check fire door" or "check fire extinguisher," and provide a description of the location of the fire door or fire extinguisher. The notices information may include an inventory of items to check (to confirm that the items are present), such as, but not limited to, a specified number of fire extinguishers, smoke detectors, or other specified items.

The notices information may be in the form of alphanumeric characters (e.g., a written description of or code associated with a notice), drawings, photographs, videos combinations thereof, or the like. In particular embodiments, notice information includes a selectable network link that allows the security person associated with the schedule to receive further action information (such as, but not limited to one or more written description, drawing, photograph, video, combinations thereof, or the like) from the backend processor device 110 and/or another processor device 150, over the network 160.

As described above, some or all of the schedule information in each schedule is composed of data received by the mobile processor devices 120 from one or more of the backend processor 110 (e.g., over the network 160 and/or through a near field communication link), other processor devices 150 over the network 160, and/or one or more checkpoint tags 140 (e.g., over a near field communication link). In further embodiments, at least some of the schedule data is pre-stored in the mobile devices 120. Once schedule information is received by a mobile processor device 120, a schedule may be selectively displayed on the display device 126 of the mobile processor device 120.

In particular embodiments, each mobile processor device 120 is configured with suitable software 121 (such as, but not limited to, one or more applications software), hardware or combinations thereof that provide the security person associated with the mobile processor device with a menu or selection interface for allowing the security person associated with the device 120 to select and display the schedule information. In particular embodiments, the menu or selection interface includes or operates with the one or more user input device(s) 128 on the mobile processor device 120, to allow the security person to manually select a schedule display mode, for displaying the schedule associated with that security person (such as, but not limited to, a display of a schedule of the type described above with respect to FIG. 5). In further embodiments, the menu or selection interface allows the security person to manually select one or more additional modes, such as, but not limited to, a facility display mode, a checkpoint route display mode, or the like.

An example menu or selection interface 600 is shown in FIG. 6, in the form of a display screen for a touch screen display device, and includes a plurality of touch locations (or buttons) for selecting from among a corresponding plurality of modes. The selection interface 600 in FIG. 6 includes a touch location 602 for selecting a schedule display mode. The selection interface 600 in FIG. 6 also includes a touch location 604 for selecting a facility display mode, a touch location 606 for selecting a checkpoint route display mode, and other modes. Other embodiments may include one or more (but not all) of the touch locations shown in the example selection interface 600 and/or additional selectable touch locations for selecting other modes or operations. Yet other embodiments employ other suitable touch screen interface configurations, or other suitable selectable operators for selecting one or more modes from among a plurality of selectable modes.

By selecting the schedule display mode (e.g., by selecting touch location 602) on the selection interface 600 displayed on the display screen 126 of a mobile processor device 120, the mobile processor device 120 causes the display screen 126 to display the schedule assigned to the security person associated with that mobile processor device 120 (such as, but not limited to, a display of a schedule of the type described above with respect to FIG. 5).

By selecting the facility display mode (e.g., by selecting touch location 604 from the menu selection interface 600), the mobile processor device 120 causes the display screen 126 to display an image showing or representing one or more facilities, such as the facility in which the security service operates. In particular embodiments, the facility display mode displays a map, drawing, photographs, video or the like, of one or more buildings, walk-ways, streets, parking lots, campuses, malls, or other physical areas in which the security service operates. In further embodiments, the image showing or representing the facility in the facility display mode also includes indicia representing locations of checkpoint tags 140 in the facility. An example of an image representing a map or plan view of a facility, as displayed in the facility display mode, is shown in FIG. 2.

In yet further embodiments, other or additional indicia is included in the image showing or representing the facility, such as, but not limited to indicia identifying one or more of other locations (non-checkpoint locations) on schedules or other locations in the facility, equipment, personnel, structural features (such as, but not limited to entrances, exits, doors, windows, fire escapes, stair cases, elevators and escalators), or the like. Alternatively or in addition, such further indicia may include indicia representing events associated with the facility, such as, but not limited to past security incidents (e.g., thefts, robberies, assaults, attempts thereof, or the like), past safety incidents (e.g., injuries, fires, leaks, or the like), or the like. Such indicia may be in any suitable form including, but not limited to one or more of alphanumeric text, a code, a drawing, a photograph, a video or other indicia describing or otherwise associated with the event.

In particular embodiments, selecting the facility display mode (e.g., by selecting touch location 604 from the menu selection interface 600) causes the mobile processor device 120 to display an image representing the facility (for example, but not limited to, an image as shown in FIG. 2), but without any indicia identifying checkpoint locations, other scheduled locations, equipment, personnel, events or other features. In such embodiments, the display presented in the facility display mode also includes one or more selectable operators (such as, but not limited to touch screen locations) that allow the security person to select further display embellishments that add indicia to the display of the facility. For example, one selectable operator may be provided that, when selected, causes the mobile processor device 120 to add the indicia identifying one or more of checkpoint locations to the image of the facility. Another selectable operator may be provided that, when selected, causes the mobile processor device 120 to add indicia identifying other locations (non-checkpoint locations) to the image of the facility. Another selectable operator may be provided that, when selected, causes the mobile processor device 120 to add indicia identifying equipment. Another selectable operator may be provided that, when selected, causes the mobile processor device 120 to add indicia identifying personnel. Another selectable operator may be provided that, when selected, causes the mobile processor device 120 to add indicia identifying events, such as described above. Accordingly, the security person can selectively add indicia (or decide not to include certain indicia) on the display of the facility in the facility display mode.

By selecting the checkpoint route display mode (e.g., by selecting touch location 606 from the menu selection interface 600), the mobile processor device 120 causes the display screen 126 to display an image showing or representing one or more checkpoints and/or paths leading to the one or more checkpoints. In particular embodiments, the checkpoint route display shows some or all of the checkpoints in the schedule assigned to the security person associated with the mobile processor device 120, but does not show checkpoints or paths for checkpoints not assigned to that security person (e.g., but assigned to other security personnel). In particular embodiments, the checkpoint route display mode displays a map, drawing, photographs, video or the like, of one or more routes containing or leading to one or more checkpoint locations (or other locations) in the schedule assigned to the security person associated with the mobile processor device 120. In particular embodiments, the checkpoint route display mode displays an image of the facility (or a portion of the facility) shown in the facility display mode, but with further indicia representing one or more checkpoint locations (or other locations) that are on the schedule assigned to the security person associated with the mobile processor device 120) and/or paths (routes) through the facility to such locations.

In yet further embodiments, other or additional indicia is included in the image of the checkpoint route, such as, but not limited to indicia identifying equipment, personnel, structural features (such as, but not limited to entrances, exits, doors, windows, fire escapes, stair cases, elevators and escalators), events or the like (such as those described above with respect to the facility display mode). In particular embodiments, the display presented in the checkpoint route display mode includes one or more selectable operators (such as, but not limited to touch screen locations) that allow the security person to select further display embellishments that add such indicia to the display of the checkpoint route. For example, one selectable operator may be provided that, when selected, causes the mobile processor device 120 to add the indicia identifying equipment. Another selectable operator may be provided that, when selected, causes the mobile processor device 120 to add indicia identifying personnel. Another selectable operator may be provided that, when selected, causes the mobile processor device 120 to add indicia identifying events, such as described above. Accordingly, the security person can selectively add indicia (or decide not to include certain indicia) on the display of the checkpoint route in the checkpoint route display mode. Each display screen (e.g., 400, 200) associated with each mode may include a selectable operator that allows the user to return to the menu selection screen 600.

Accordingly, once the security person has received a schedule (for example, per box 302 in the process 300 of FIG. 3), the security person may carry the associated mobile processor device 120 and travel to each location on the schedule, with the mobile processor device 120. The security person may travel to each location on the schedule, for example by following a pre-defined route (which is displayed on the mobile processor device 120, when in the checkpoint route display mode), or by following any other appropriate route that allows the security person to meet the time requirement specified by the time information in the schedule.

Figure 3:
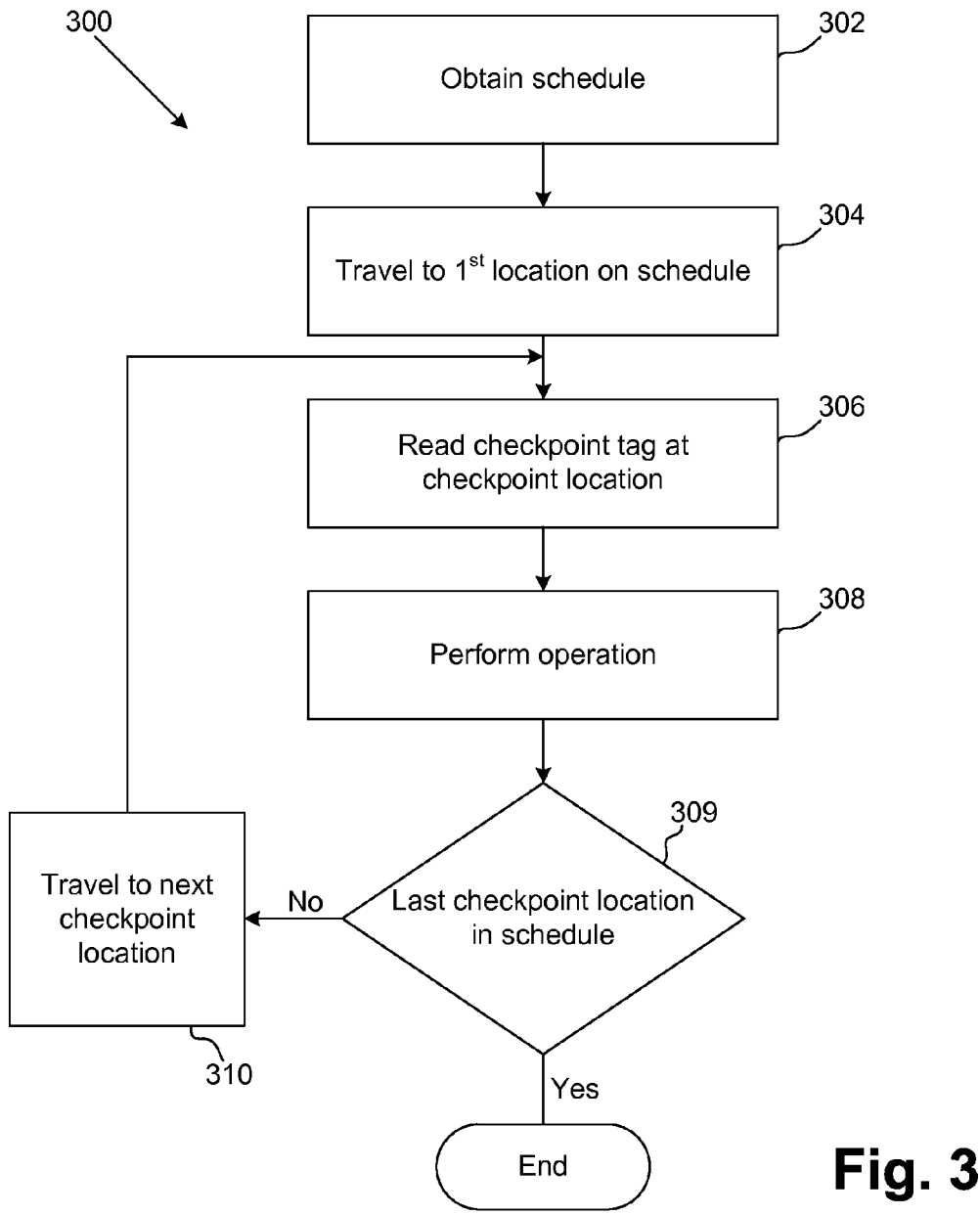
FIG. 3 is a flow chart of a checkpoint schedule process according to an embodiment of the invention.

For example, referring back to the process 300 in FIG. 3, the security person (with the associated mobile processor device 120) travels to a first checkpoint location on the schedule (per box 304). When the security person is present at the checkpoint location, the mobile processor device 120 is brought within sufficient proximity to one or more checkpoint tags 104 at the checkpoint location to allow the mobile processor device 120 to read or otherwise interact with those checkpoint tag(s) 104 (per box 306).

In particular embodiments, one or more checkpoint tag(s) 104 are arranged at a checkpoint location in a position that allows a mobile processor device 120 to read or interact with at least one checkpoint tag 104, automatically, when the security person (carrying a mobile processor device 120) is present anywhere within the checkpoint location or is present at a pre-defined zone within an area of the checkpoint location. In further embodiments, the security person is informed of the specific or general location of the checkpoint tag(s) 104 within an area of a checkpoint location and must place the mobile processor device 120 adjacent (or within a specified distance) from the checkpoint tag(s) 104 to read or interact with the tag(s). In such further embodiments, one or more of the facility display mode and the checkpoint route display mode shows a display that includes display information identifying the specific or general location of each checkpoint tag 104 in the facility or route.

Such display information may include indicia (text, an icon, combinations thereof, or the like) representing a checkpoint tag 104, where the indicia is positioned at one or more locations on a map or other plan view of the facility or route corresponding to the actual locations of the checkpoint tag(s) 104 in the facility or route. Alternatively or in addition, such display information may include one or more textual descriptions of locations, photographs, drawings and/or videos showing the specific or general location of checkpoint tag(s) 104 within the area of a checkpoint location. In particular embodiments, the display screen for the facility display mode and/or the checkpoint route display mode shows each checkpoint location without indicia identifying the specific location of the checkpoint tag 104, but further includes a selectable touchscreen area or other manually selectable operator that, when selected, causes the display screen to show the further indicia representing the specific or general location of each checkpoint tag 104 in each checkpoint location.

When a security person is at a checkpoint location on the schedule (and is in sufficient proximity to a checkpoint tag 104 at the checkpoint location), the mobile processor device 120 reads or interacts with those checkpoint tag 104. In particular embodiments, each checkpoint tag 104 includes a readable storage device 141 (as described above) that stores data that can be read by suitable scanning or reading electronics and software present on each mobile processor device 120. In such embodiments, the checkpoint tag 104 comprises a passive device that requires no on-board power source. In other embodiments, one or more checkpoint tags 104 includes processor electronics, transmitter electronics, receiver electronics, transceiver electronics or the like, configured for interactive communication with mobile processor devices 120.

Each checkpoint tag 104 may store any suitable information, to be read by (or otherwise communicated to) mobile processor devices 120 that are within sufficient proximity of the checkpoint tag 104. In particular embodiments, such information includes an identification code that has been pre-assigned to the checkpoint tag 104, such as, but not limited to, a unique identification code that is different from the identification code stored on each other checkpoint tag 104 in the system 100.

In further embodiments, one or more of the checkpoint tags 104 stores additional information, such as, but not limited to, location information (that identifies or corresponds to a physical or geographic location, such as the location of the checkpoint tag or the checkpoint location), action information (such as the type of information included in the action information column 406 of a schedule 400), notice information (such as the type of information included in the notices column 408 of a schedule 400), other message information for display on the mobile processor device 120, or control information for controlling the mobile processor device 120 to perform an operation (such as, transmit record information to the backend processor device 110 and/or another processor device 150, or other operation). Alternatively or in addition, such additional information stored on the checkpoint tags 104 may include other schedule or route information, such as, but not limited to information regarding other locations to add or delete to a security person's route, changes or additions to time information on a security person's schedule, or the like.

Each mobile processor device 120 is configured by software 121, hardware, or combinations thereof, to perform certain operations (per box 308 in FIG. 3) upon or in response to reading (or otherwise receiving) information from a checkpoint tag 104.

In particular embodiments, such operations relate to actions described in the action information (column 506) of the schedule, for the checkpoint location of the checkpoint tag 104. Alternatively or in addition, such operations relate to other actions.

Such operations may include one or more of storing information read from the checkpoint tag 104, displaying information on the display device 126, transmitting information to the backend processor device 110 and/or other processor device 150, obtaining, storing and/or transmitting further information (such as, but not limited to data from a sensor, location detector or other detector, time information, camera or other image detecting device, microphone or other audio detecting device, or the user input device 128). In particular embodiments, in response to reading a first checkpoint tag 140 at a checkpoint location, the mobile processor device 120 displays a message to the person 101, where the message requests that the person 101 perform a predefined task at or near the checkpoint location. Example tasks may be to input sensor data, time information, image data, audio data, observe and check a piece of equipment (e.g., the status of a fire door, the operation of a light or machine, the status of a fire hose or fire extinguisher, or the like). Other example tasks may be to meet with a designated person, to operate a piece of equipment (e.g., turn on or off a light or machine, or the like).

Once the task or operation (per box 308 of FIG. 3) is completed, the process in FIG. 3 proceeds with a determination of whether or not the checkpoint location associated with that task or operation is the last checkpoint location on the schedule 500. If so, then the process in FIG. 3 ends. If not, then the person 101 travels to the next checkpoint location (per box 310) and then continues with the process at box 306 in FIG. 3.

In particular embodiments, each mobile processor device 120 is configured to store certain information that is read (or otherwise received) from a checkpoint tag 104 and/or other information, for example, in the electronic storage 124 in the mobile processor device 120. For example, upon reading (or receiving) an identification code of a checkpoint tag 104, the mobile processor device 120 stores the identification code, a portion of that code or other information that provides a record that the mobile processor device 120 had read the code. Accordingly, at a later time, the stored record can be retrieved from the mobile processor device 120, to verify that the checkpoint tag had been read (e.g., to verify that the security person with the mobile processor device 120 had been at the checkpoint location).

In further embodiments, other information is included in the stored record. For example, in particular embodiments, the mobile processor device 120 stores time information corresponding to the time at which the mobile processor device 120 read (or otherwise received) the identification code or other information from a checkpoint tag 104, as part of the record. Accordingly, at a later time, the stored record can be retrieved to verify that the checkpoint tag 104 had been read during an appropriate time, such as during a time period specified in the schedule 500 for the checkpoint location of that tag (e.g., to verify that the security person with the mobile processor device 120 had been present at the checkpoint location during the time, date, time period or date period specified in the schedule assigned to that security person). In particular embodiments, the mobile processor device 120 is configured to obtain time information from a clock or timer included in the mobile processor device 120. In further embodiments, the mobile processor device 120 is configured to retrieve time information from a network source (e.g., the backend processor device 110, or other processor device 150) over the network 160.

Alternatively or in addition to storing time information, in further embodiments the mobile processor device 120 stores location information as part of the record. Such location information identifies the physical or geographical location of the mobile processor device at (or near) the time at which the mobile processor device 120 reads (or otherwise receives) the identification code or other information from a checkpoint tag 104. Accordingly, at a later time, the stored record can be retrieved to verify that the checkpoint tag 104 had been read at a time when the mobile processor device 120 (and, thus, the security person associated with that device) was present at the expected location of the checkpoint tag 104. In particular embodiments, the mobile processor device 120 is configured to obtain location information from location acquisition electronics and software included in the mobile processor device 120, such as, but not limited to global positioning system (GPS) or other satellite or terrestrial positioning system electronics and software in the mobile processor device.

Alternatively or in addition to storing time information and/or location information, further embodiments include storing one or more of the following information: identification information relating to the identity of the security person carrying the mobile processor device 120, text or audio comments from the security person, photographs or other image information taken by the security person, sensor data (such as, but not limited data obtained by an electronic-field sensor, a light sensor, an humidity sensor, a radiation sensor, an air quality sensor, a toxin or other substance sensor), or the like. In embodiments in which identification information relating to the identity of the security person is stored as part of the record, the identification information can be, for example, identification code or other data included in the identification tag 130 of the security person associated with the mobile processor device 120. In such embodiments, such identification code or other data is read directly from the identification tag 130 by the mobile processor device 120, for example, by scanning or reading the identification tag 130 at the beginning or other designated portion of the checkpoint route, at each location on the checkpoint schedule assigned to the security person, and/or each time the mobile processor device 120 reads (or otherwise receives) information from a checkpoint tag 140.

In particular embodiments in which text or audio comments from the security person is stored as part of the record, the text or audio comments are recorded directly into the mobile processor device 120, for example, through existing user input operators 128 included in the mobile processor device 120 (such as, but not limited to, a keyboard or touchscreen for inputting text, and a microphone and audio recording electronics for inputting audio information). In particular embodiments in which photographs or other image information is stored as part of the record, the photographs or other image information is recorded directly into the mobile processor device 120, for example, through existing cameras or other image sensors included in the mobile processor device 120. In particular embodiments in which sensor data is stored as part of the record, sensor data is recorded directly into the mobile processor device 120, for example, through existing sensors included in or connected to the mobile processor device 120. In such embodiments, the mobile processor device 120 includes one or more sensors such as, but not limited to an electronic-field sensor, a light sensor, an humidity sensor, a radiation sensor, an air quality sensor, a toxin or other substance sensor, or the like.

Embodiments described above store record information on an electronic storage device 124 in the mobile processor devices 120, including information read (or otherwise received) from checkpoint tags 104 and, in some embodiments, additional time, location or other information. However, in other embodiments, such record information is (also or alternatively) communicated by the mobile processor device 120 to the backend processor 110 and/or other processor 150, over the network 160. Alternatively or in addition, each mobile processor device 120 is configured to communicate such record information to the backend processor device 110 or other processor device, through a wired or near field communication connection. In such embodiments, the record information is stored by the backend processor device 110 or other processor device 150, for example, in a data storage device 114, 115*a* or 115*b*.

In particular embodiments, each mobile processor device 120 is configured to communicate such record information to the backend processor device 110 or other processor device 150, at the time (in real-time) or within a pre-defined time from the time that the mobile processor device 120 reads (or otherwise receives) information from a checkpoint tag 104. For example, according to certain embodiments, each mobile processor device 120 is configured to transmit some or all of such record information, each time the mobile processor device 120 reads any checkpoint tag 104 (or reads a pre-defined one or more of the plural checkpoint tags 104 that have been designated to cause such transmission).

In other embodiments, each mobile processor device 120 is configured to transmit some or all of such record information at one or more predefined times of day or dates (for example, as determined by a timer or clock in or associated with the mobile processor device 120 and/or time information received by the mobile processor device 120 from a suitable source over the network 160). In yet other embodiments, each mobile processor device 120 is configured to transmit some or all of such record information when the mobile processor device 120 is determined to be within a predefined geographic location (area), for example, as detected by a GPS or other location detector on or associated with the mobile processor device 120. In yet other embodiments, one or more of the mobile processor devices 120 is configured to transmit record information in accordance with any combination of manners discussed above and/or different ones of the mobile processor devices 120 in the system 100 are configured to transmit record information in different respective manners as discussed above.

Accordingly, the backend processor device 110 or other processor device 150 is able to receive and maintain a record for each mobile processor device 120 in the system 100, and is able to update the records as new information is obtained (e.g., as mobile processor devices 120 read and communicate information from one or more of the checkpoint tags 104, timers, clocks, location detectors or other sensors) on an ongoing basis. In further embodiments, the backend processor device 110 (and/or the mobile processor device 120 and/or the processor device 150) is configured to process record information in accordance with one or more pre-stored rules, applications or programs.

Particular embodiments employ one or more rule-based programs that apply rules that relate to or employ record information. Such rule-based programs are stored in one or more electronic storage devices 124, 114, 115*a* and 115*b*, and retrieved by the associated mobile processor device 120, backend processor device 110 or other processor device 150 that operates the rule-based program. Such rules include, but are not limited to, rules that control the backend processor device 110, the mobile processor device 120 and/or the other processor device 150 to perform a predefined operation in response to the record information showing that a particular checkpoint tag 104 is read. In other embodiments, such rules include, but are not limited to, rules that control the backend processor device 110, the mobile processor device 120 and/or the other processor device 150 to perform a predefined operation in response to another predefined event or condition in the record information (such as, but not limited to a predefined threshold value reached by a parameter sensed or detected with a timer, clock, sensor or detector on or associated with the mobile processor device 120, as discussed above).

The predefined operation includes, but is not limited to, one or more of an operation that causes the mobile processor device 120 to display a predefined message, an operation that causes the mobile processor device 120 to transmit information to the backend processor device 110 and/or other processor device 150, an operation that causes the backend processor device 110 and/or the other processor device 150 to transmit information to the mobile processor device 120 (such as message information for display, new or updated schedule information, new or updated rules or programs, or the like), or other suitable operation.

The mobile processor device 120, backend processor device 110 and/or other processor device 150 operates with the rule-based program(s) to provide a rule engine that controls the backend processor device 110, the mobile processor device 120 and/or the other processor device 150 to perform predefined operations in response to the occurrence of predefined events or conditions.

In particular embodiments, such rule engines include programs that control a processor device 120, 110 and/or 150 in a manner that can be represented by if-then operations. Such if-then operations can include, but are not limited to one or more of the following:

(a) If the mobile processor device 120 reads a checkpoint tag 140, then (in response) the mobile processor device 120 is controlled to transmit certain information to the backend processor device 110, such as information relating to the checkpoint tag or its location, information read from the checkpoint tag or other predefined information.

(b) If the mobile processor device 120 reads a checkpoint tag 140 at a time or within a time period for that checkpoint tag (or associated checkpoint) specified in the schedule assigned to the person with the mobile processor device, then (in response) data is transmitted to the backend or other processor device 110 or 150, a record is made of the reading and/or no further action is taken.

(c) If the mobile processor device 120 fails to read a checkpoint tag 140 at a time or within a time period for that checkpoint tag (or associated checkpoint) specified in the schedule assigned to the person with the mobile processor device, then (in response) data is transmitted to the backend or other processor device 110 or 150, a record is made of the failed reading and/or no further action is taken.

In particular embodiments, the rule engine is configured to control certain operations that are specifically applicable to a particular service or activity (such as, but not limited to, a security service, an inventory control service, a delivery service, an education service, a medical service or the like). In other embodiments, the rule engine is configured to provide more general operations that apply to more than one type of service or activity. In yet other embodiments, the rule engine is configurable (for example, by an administer or other designated personnel associated with the service that operates the system 100) to allow the designated personnel to design rules for that service. In particular embodiments, the rule engine is configurable during operation of the system 100, such that, for example, one or more designated personnel (e.g., supervisors, managers or other personnel authorized to add or alter programmed rules) adds or changes one or more of the rule processes based on information received from one or more mobile processor devices 120.

In this manner, embodiments may be configured to provide a level of flexibility in the rule engine, to allow the rule engine to be specifically configured and/or changed, as needed. In addition, embodiments can be configured to provide a relatively powerful rule engine that can control many different operations and respond to many different criteria (including environmental criteria, user input, or other conditions).

Further software (included in or separate from the rule engine) controls additional operations of the mobile processor device 120, such as, but not limited to display operations. In example embodiments, such display operations include a display menu (displayable on the display device 126) that includes user-selectable icons (or other operators) that allows a person associated with the mobile processor device 120 to select from among a plurality of display options. In particular embodiments, the display options include one or more of the following options that, when selected, cause the mobile processor device 120 to display on the display device 126: (a) the checkpoint schedule assigned to the person associated with the mobile processor device 120; (b) a list of checkpoints in the checkpoint schedule assigned to the person associated with the mobile processor device 120; (c) a map or other graphic representation of a facility with locations of checkpoints on the checkpoint schedule identified on the map or other graphic representation; (d) a list of all of the checkpoints in a particular facility, whether or not they are on the checkpoint schedule assigned to the person associated with the mobile processor device 120; (e) a map or other graphic representation of a facility with all of the checkpoint locations identified on the map or other graphic representation regardless of whether or not they are on the checkpoint schedule assigned to the person associated with the mobile processor device 120; (f) locations of one or more checkpoint tags 104 within each checkpoint area (e.g., areas 200a,d,e, g, h, i. j in FIG. 2) on the checkpoint schedule assigned to the person associated with the mobile processor device 120; (g) locations of all checkpoint tags 104 within each checkpoint area regardless of whether or not they are on the checkpoint schedule assigned to the person associated with the mobile processor device 120.

Yet further software (included in or separate from the rule engine) controls additional operations of the mobile processor device 120, such as, but not limited to timer or timing operations. In example embodiments, the mobile processor device 120 includes timer electronics that provide time information for determining a time of day and/or for timing a time period. Alternatively or in addition, the mobile processor device 120 obtains such time information from the backend processor device 110, other processor device 150 or other source over the network 160. In particular embodiments, the mobile processor device 120 is configured to display (or otherwise provide) user-selectable start and stop icons (or other control operators) that allow the person associated with the mobile processor device 120 to selectively start and stop a timer. In such embodiments, the time period timed by the timer (from the operation of the start icon) is displayed, for example, on display device 126.

In further embodiments, the timer is configured to time certain time periods and display and/or transmit a message (such as, but not limited to, a warning message) when a pre-defined time period has expired or is about to expire. In one example, the timer is configured to time the period of time from (starting from) the time at which the mobile processor device 120 reads a checkpoint tag 140 in a checkpoint schedule, to (ending at) the time at which the mobile processor device 120 reads another checkpoint tag 140 in the checkpoint schedule (e.g., the next checkpoint tag listed in the checkpoint schedule). In further examples of such embodiments, the mobile processor device 120 is configured to display a message (such as, but not limited to, a warning message), if a pre-defined time period has expired (or is about to expire) from the time at which a first checkpoint tag 140 is read, before another (or the next scheduled) checkpoint tag 140 is read. For example, the message may include text that informs the person associated with the mobile processor device 120 that that person is scheduled to be at the next checkpoint location at that time (or at a particular defined time, such as the time specified in the checkpoint schedule assigned to that person).

In yet further embodiments, the timer is configured to time other time periods, such as, but not limited to, a break time period during which the person associated with the mobile processor device 120 is taking a break (stopping work for a period of time, for example, to eat, rest, run errands, or conduct other activities not associated with the service). In such embodiments, start and stop icons (or other operators), as described above, are provided to allow the person associated with the mobile processor device 120 to selectively start and stop a break time timer. Also in such embodiments, the mobile processor device 120 is configured to display (e.g., on display device 126) text or other indicia that represents the time period from the activation of the start icon (or other operator).

Alternatively or in addition, the mobile processor device 120 is configured to display (e.g., on display device 126) text or other indicia that represents the time period remaining to the end of a pre-defined break time period (where the pre-defined break time period started upon the activation of the start icon or operator). In particular embodiments, the mobile processor device 120 is configured to display a message during the break time period (or at the end of the break time period) that notifies the person associated with the mobile processor device 120 that the break time will end at a particular time or is about to end (or has already ended). The message may be in the form of a text message, an audio message, a visual light or other visual indicator or any combination thereof.

In yet further embodiments, the timer is configured to time a work time period during which the person associated with the mobile processor device 120 is working (or performing tasks associated with the service or other activity for which the system 100 is used). In such embodiments, start and stop icons (or other operators), as described above, are provided to allow the person associated with the mobile processor device 120 to selectively start and stop a work time timer. In further embodiments, the mobile processor device 120 is configured to start (or stop) the work time timer when (in response to) the mobile processor device 120 reads an ID tag 130 of the person associated with the mobile processor device 120. Thus, a security person can start the work time timer at the beginning of a work shift by scanning (or otherwise reading) his/her ID tag 130, through scanning or reading electronics on the mobile processor device 120. Then, at the end of the work shift, that person can scan or read his/her ID tag 130, again, to stop work time timer.

In particular embodiments, time information (e.g., time periods) obtained by the work time timer and/or the break time timer is recorded by the mobile processor device 120 and stored in electronic storage 124. In further embodiments, the mobile processor device 120 is configured to communicate that time information to the backend processor device 110 and/or other processor device 150, e.g., for storage in electronic storage device 114, 115*a* or 115*b*. In yet further embodiments, such time information is used to evaluate time and attendance, calculate payroll and/or to evaluate the performance of the person associated with the mobile processor device 120.

Accordingly, the mobile processor device 120, the backend processor device 110 and/or the other processor device 150 may be configured to receive such time information and to store and/or process received time information according to one or more processing routines (for example, controlled by software stored in electronic storage device 124, 114, 115*a* or 115*b*). In particular embodiments, the processing routines include one or more of a payroll routine (that calculates and/or organizes payroll payment amounts or other financial values based at least in part on the time information), a scheduling routine (that determines or organizes time schedules based at least in part on the time information), or the like.

As discussed herein, the mobile processor device 120 is configured to receive user-input information (e.g., text, audio, image and/or video information) that is input by the person associated with the mobile processor device 120, through the input device 128. In addition, the mobile processor device 120 is configured to obtain sensor or detector information as discussed herein. In addition, the mobile processor device 120 is configured to store and/or process that information or communicate that information to the backend processor device 110 and/or other processor device 150, for storage and/or processing, as discussed above.

In particular embodiments, user-input information and/or sensor or detector information is associated with location information corresponding to the location of the mobile processor device 120 (as determined by location detector electronics included in or otherwise associated with the mobile processor device 120) at or within a predefined period from the time at which the user-input information and/or sensor or detector information is entered or received by the mobile processor device 120. For example, the location information can be associated with user-input information and/or sensor or detector information in any suitable manner, such as, but not limited to, a table or other rational arrangement that associates such information together, or by appending data corresponding to location information to data corresponding to user-input information and/or sensor or detector information.

In this manner, for example, a security person associated with the mobile processor device 120 can take video or images of a scene and/or record audio at or near a checkpoint (or elsewhere in a facility), and communicate corresponding video, image and/audio information, over the network 160, to other personnel (such as, but not limited to, supervisors, managers, specialists, experts, or the like) at the backend processor device 110 or other processor device 150. Alternatively or in addition, the security person can communicate text information, sensor or detector information, and/or location information to the other personnel. The other personnel may, then, take appropriate actions in response to the information, such as, but not limited to, recording the information in electronic storage (e.g., electronic storage 114, 115*a* and/or 115*b*) contacting other security personnel (e.g., by sending messages to mobile processor devices 120 associated with those personnel, or other appropriate mode of communication) for assistance, contacting outside agencies (e.g., fire department, police department, ambulance, bomb squad, hazardous substance squad, or the like) for assistance, updating schedule information of one or more schedules 400, or other action.

As discussed above, in particular embodiments, information is communicated from the mobile processor device 120 to the backend processor device 110 and/or other processor device 150, when (in response to or within a predefined time period from when) the mobile processor device 120 reads or otherwise receives information from a checkpoint tag 140. In particular embodiments, the information communicated to the backend processor device 110 and/or other processor device 150 includes or corresponds to information read (or otherwise received) from the checkpoint tag 140 and may also include one or more of time information, user-input information, sensor or detector information and location information (e.g., obtained at that time or previously obtained and stored in the mobile processor device 120).

In certain embodiments, one or more of the mobile processor devices 120 is configured to read (or otherwise receive) information from a checkpoint tag 140 more than one time while the mobile processor device 120 is located in a checkpoint area. In particular embodiments, a mobile processor device 120 is configured to read (or otherwise receive) information from a checkpoint tag 140 as the person associated with the mobile processor device 120 enters the checkpoint area with the mobile processor device 120, and then read (or otherwise receive) information from the same checkpoint tag 140 (or a different checkpoint tag 140) as the person leaves the checkpoint area. Thus, for example, certain personnel (such as, but not limited to supervisors) are associated with mobile processor devices 120 that are configured to require multiple readings of one or more checkpoint tags 140 at each checkpoint location, while other personnel are associated with mobile processor devices 120 that are configured to require no readings or a single (or other predefined number) of readings of a checkpoint tag 140 at each checkpoint location.

As discussed above, in certain embodiments, information may be permanently stored in a checkpoint tag 140. In other embodiments, some or all of the information stored in a checkpoint tag 140 may be altered or written over, or additional readable information may be added to the checkpoint tag 140. In particular embodiments, one or more, but not all of the mobile processor devices 120 are configured to write information to one or more of the checkpoint tags 140. Thus, one or more (but not all) of the mobile processor devices 120 in the system 100 may be associated with one or more designated personnel (such as, but not limited to, supervisors, managers or certain personnel tasked with updating tag information) who have authority to add or alter information on checkpoint tags 140. Other personnel (i.e., other mobile processor devices 120 in the system 100) are able to read information from checkpoint tags 140, but are not able to write or alter information on checkpoint tags 140.

In further embodiments, some or all of the mobile processor devices 120 in the system 100 are configured to allow the personnel associated with those devices to write, alter or add first information (or first information in a first storage area) of the checkpoint tags 140, but not second information (or second information in a second storage area) of the checkpoint tags 140. In such embodiments, other, pre-designated mobile processor devices 120 (e.g., for supervisors, managers or other designated personnel) are configured to allow writing, altering or adding second information (or second information in the second storage area) of the checkpoint tags. 141. In such embodiments, pre-designated personnel are allowed to write information onto a checkpoint tag 140 that can be read by another mobile processor device 120 (e.g., at a later time) and processed to cause a display of a message on that other mobile processor device 120, cause a change in a schedule 400 assigned to the person associated with that other mobile processor device 120, and/or cause some other action to be performed by that other mobile processor device 120.

As discussed above, each mobile processor device 120 is configured to communicate information to and from the backend processor device 110 and/or other processor device 150, where such information includes, but is not limited to, one or more of personnel identification information, device identification information, information read (or otherwise received) from an identification tag 130, information read (or otherwise received) from a checkpoint tag 140, sensor or detector information, location information, and/or user-input information. In particular embodiments discussed above, each mobile processor device 120 may be configured to transmit such information to the backend processor device 110 and/or other processor device 150, each time the mobile processor device reads (or otherwise receives) information from a checkpoint tag 140 and/or upon the occurrence of other predefined events or times as discussed above. Alternatively or in addition, one or more of the mobile processor devices 120 in the system 100 (i.e., first mobile processor devices 120) are configured to transmit such information to one or more other mobile processor devices 120 in the system 100 (i.e., second mobile processor devices 120), e.g., over the network 160 or other suitable communication link. In this manner, the second mobile processor devices 120 may be associated with, for example, supervisors, managers or other designated personnel who are authorized to receive such information from the first mobile processor devices 120.

In particular embodiments one or more of the first mobile processor devices 120 are configured to transmit a message (such as, but not limited to an alert message) to the backend processor device 110, another processor device 150 and/or a second mobile processor device 120, if the first mobile processor device 120 is determined to arrive at a checkpoint location late or early (e.g., before or after a time or time period designated in a schedule 400 assigned to the person associated with that mobile processor device). In further embodiments, a message is sent, if the first mobile processor device 120 is determined to arrive at the checkpoint location on time (e.g., at or within the time designated in the schedule 400). In yet further embodiments, a message is sent, if a start break or stop break operator on the first mobile processor device 120 is activated (indicating that the person associated with that mobile processor device 120 has started or stopped a break period, rest period, meal period, or other pre-defined period). In yet further embodiments, a message is sent, if a start or stop work operator on the first mobile processor device 20 is activated (indicating that the person associated with that mobile processor device 120 has started or stopped a work period).

In further embodiments, the mobile processor devices 120 are configured to transmit a message in response to the detection of a pre-designated event or condition, such as, but not limited to the detection of an event or condition having a value that meets or is above or below a predefined threshold value. For example, such pre-designated events or conditions can include one or more of a sensor value that meets or is above or below a predefined value, a detection that the mobile processor device 120 has reached a pre-defined location, a predefined time period expires, or the like.

In further embodiments, the mobile processor devices 120 are configured to provide personnel associated with those devices with a manual operator (such as, but not limited to, a touchscreen operator, button, switch, or the like) that can be selectively, manually operated to cause the mobile processor device 120 to transmit an emergency message (or other pre-defined message). In that manner, the personnel associated with the mobile processor devices 120 are able to transmit an emergency message, with a manual activation of an operator.

In particular embodiments, the mobile processor devices 120 are configured such that, when an emergency message operator is selectively activated by the user associated with a mobile processor device 120, the mobile processor device 120 initiates a timing process to time a predefined period (such as, but not limited to five seconds) from the time of activation of the operator and then transmits the emergency message after (or in response to) the expiration of that time period. In particular embodiments, the emergency message includes (or is sent with) additional information such as, but not limited to, location information corresponding to the location of the mobile processor device 120 at the time that the emergency message operator is activated (e.g., as determined by a GPS or other location determining device associated with the mobile processor device 120), time information corresponding to the time that the emergency operator is activated (e.g., as determined by timer electronics associated with the mobile processor device 120), sensor information recorded by the mobile processor device 120 before or at the time that the emergency message operator is activated, user-input information recorded by the mobile processor device 120 before or at the time that the emergency message operator is activated, or other suitable information.

In further embodiments, the mobile processor device 120 is configured to vibrate (e.g., via a vibration device within the mobile processor device 120), display visual indicia, display an audio message and/or provide other user-perceptible information, or combinations thereof, during the predefined period following activation of the emergency message operator. In addition, the mobile processor device 120 is configured with a manual operator (such as, but not limited to a touchscreen operator, button, switch or the like) that can be selectively, manually operated during the predefined period following activation of the emergency message operator, to cause the mobile processor device 120 to cancel the emergency message operation and not send the emergency message when the predefined period expires. Accordingly, the person associated with a mobile processor device 120 may selectively active the emergency message operator (e.g., if that person observes an apparent emergency situation), but can cancel the transmission of the emergency message during the predefined period (e.g., if that person determines that no emergency has occurred) or can allow the transmission of the emergency message at the end of the predefined period (e.g., if that person determines that the emergency is likely real). Furthermore, the mobile processor device 120 provides a user-perceptible indication to the person associated with the mobile processor device 120, that the emergency message operator has been activated and the predefined time period (to selectively cancel transmission of the emergency message) is running.

In particular embodiments, the message sent from the mobile processor device 120 (and received by the backend processor device 110, other processor device 150 and/or second mobile processor device 120) includes information that defines the event that resulted in the message being sent (such as, but not limited to, information that defines the event as a late arrival to a checkpoint location, an early arrival to a checkpoint location, an on-time arrival to a checkpoint location, a start of a break, a stop of a break, a start of a work period, a stop of a work period, or an emergency). In such embodiments, the backend processor device 110, other processor device 150 and/or second mobile processor device 120 that receives the message is configured to display a user-perceptible display (representing the type of message received) to personnel associated with those processors and/or take other pre-defined action as described above.

Accordingly, personnel associated with the backend processor device 110, other processor device 150 and/or second mobile processor device 120 that receives the message are able to view information received from one or more mobile processor devices 120. Thus, for example, supervisors or other designated personnel can be assigned the task of monitoring information received from one (or plural) designated mobile processor devices 120 (or all of the mobile processor devices 120 in the system 100). In particular embodiments, such supervisors or other designated personnel receive information (as discussed above) from the one or more designated mobile processor devices 120 in real time (as the information is being received or entered into the mobile processor devices 120). In other embodiments, the supervisors or other designated personnel receive such information at one or more predefined times (e.g., where the mobile processor devices 120 are configured to receive and record such information and, then, transmit that information at one or more pre-defined times).

In further embodiments, the system 100 receives additional information from additional sources (such as, but not limited to the backend processor device 110, other processor device 150 or other sources). Such additional information can include, but is not limited to, information relating to events or conditions associated with the facility in which the system 100 is operated and/or personnel associated with the facility or service. In particular embodiments, the additional information includes incident information (relating to previous incidents that have occurred at or near the facility), such as, but not limited to, information obtained by an incident tracking system as described in U.S. patent application Ser. No. 12/356,985 (titled "Incident Tracking Systems and Methods"), or other suitable incident tracking or recording system.

In further embodiments, the scanner associated with the mobile processor device 120 may be employed to scan other detectable items, such as, but not limited to, data or codes (such as, but not limited to bar codes or other types of scannable codes) that are applied to an entry ticket, ID tag or other tag, merchandise or other predefined item. Thus, for example, the person associated with the mobile processor device 120 may be a designated ticket checker at an entrance or exit to or from a designated area (concert hall, store, office, theater, restaurant, or other location) to scan tickets or other items carried by people seeking to enter or exit the designated area. In such embodiments, the person associated with the mobile processor device 120 may operate the mobile processor device 120 to scan tickets or other items, to read and record information from the ticket or other item (similar to the manner of scanning tags as described above). Also in such embodiments, the scanned information can be communicated from the mobile processor device 120 to the backend processor device 110, for storage or evaluation. The backend processor device 110 may be programmed to run one or more evaluation routines to evaluate the scanned information for example, to confirm that the ticket or other scanned item is authentic or otherwise acceptable. Furthermore, the backend processor device 110 may be configured to provide a notification to the mobile processor device 120 regarding whether or not a scanned ticket or other item has been determined to be authentic or otherwise acceptable. The person associated with the mobile processor device 120 may, then, use that information to determine whether or not to allow the ticket (or other item) holder to enter or exit the designated area.

Initial System Setup Examples:

A system 100 is configured by obtaining and associating a plurality of mobile processor devices 120 with a corresponding plurality of designated personnel 101, and obtaining and connecting one or more backend processor devices 110 and other processor devices 150 to a communication network 160. According to particular embodiments of the present invention, suitable software is installed in each of the mobile processor devices 120, backend processor device(s) 110 and other processor device(s) 150, as discussed above.

In addition, checkpoint tags 140 are disposed at checkpoint locations in a facility (e.g., shopping mall 200) in which the system 100 is employed. As discussed above, at the time of installing each checkpoint tag 140 (or after installation), designated personnel perform a checkpoint tag initializing process, to provide and store data associating each respective checkpoint tag 140 with a respective checkpoint location. An example of a checkpoint tag initializing process 700 is described with reference to FIG. 7.

Figure 7:
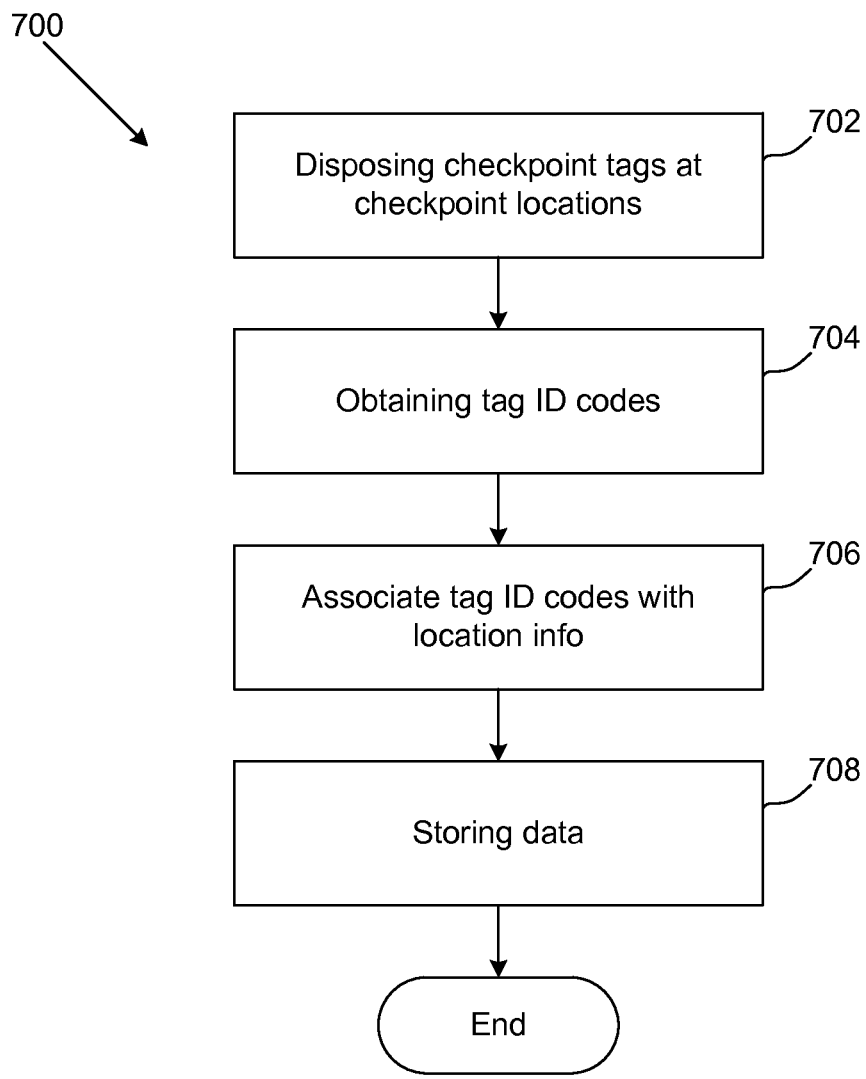
FIG. 7 is a flow chart of a checkpoint setup process.

In the example embodiment of FIG. 7, a checkpoint tag initializing process 700 includes disposing checkpoint tags 140 are checkpoint locations (as represented by box 702), obtaining a tag identification code of each checkpoint tag (as represented by box 704), associating each checkpoint tag identification code with location information (as represented by box 706), and storing data corresponding to that association (represented by box 708).

Checkpoint tags 140 are disposed at checkpoint locations (per box 702) in accordance with any suitable manner of delivering checkpoint tags 140 to checkpoint locations and securing the checkpoint tags 140 to suitable structures at the checkpoint locations. For example, checkpoint tags 140 may be carried to checkpoint locations by designated personnel and attached to structures at the checkpoint locations, as discussed above.

Checkpoint tag identification codes are obtained (per box 704) in any suitable manner. In an example embodiment, the tag identification code of each checkpoint tag 140 is obtained from pre-stored information on the checkpoint tag 140. In that embodiment, at or after installation of a checkpoint tag 140, a designated person 101 brings an associated mobile processor device 120 within sufficient proximity to the checkpoint tag 140 and reads pre-stored information from the checkpoint tag 140. The pre-stored information includes, for example, checkpoint tag identification information that identifies the checkpoint tag 140 (e.g., uniquely identifies each checkpoint tag 140 relative to each other checkpoint tag). Alternatively, the checkpoint tag identification code is obtained by generating or selecting a code and then writing that code onto the checkpoint tag 140 by the mobile processor device 120. At the same time, the checkpoint tag identification code is recorded by the mobile processor device as having been assigned to the checkpoint tag 140.

The checkpoint tag identification code is then associated with the checkpoint location (per box 706). In particular embodiments, the checkpoint location is known in advance and previously entered into the mobile processor device 120, or is entered by the designated personnel (e.g., through suitable input electronics on the mobile processor device 120). In other embodiments, the checkpoint location is determined by determining the location of the mobile processor device 120 (e.g., using GPS or other location detection electronics associated with the mobile processor device 120) at a time when the mobile processor device 120 is in sufficient proximity to the checkpoint tag 140 to read that tag.

In one embodiment, the mobile processor device 120 is configured to associate the information read from the checkpoint tag 140 with the location information. In other embodiments, the mobile processor device 120 transmits the information read from the checkpoint tag 140 and the location information to the backend processor device 110 and/or other processor device 150, which are configured to associate the tag information with the location information. The information may be associated by appending the information together and/or associating the information in a table or other suitable data structure. Data corresponding to and representing the association is stored in electronic storage 124, 114, 115*a* and/or 115*b* (per box 708).

In particular embodiments, the designated personnel may write information into the checkpoint tag 140 during or after initializing. Such additional information may include, but is not limited to, one or more messages, new or updated schedules or schedule information to be displayed to all other personnel (or to certain pre-designated other personnel) when those other personnel read the checkpoint tag 140 at a later time.

With the checkpoint tags 140 initialized, checkpoint schedules are generated. The checkpoint schedules include checkpoint locations and one or more of time, action and notice information, as described herein. The checkpoint schedules are assigned to designated personnel for performing checkpoint services as described herein.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:

1. A checkpoint system comprising:
   a plurality of checkpoint tags, each checkpoint tag configured to be located at a different checkpoint location relative to each other checkpoint tag, each checkpoint tag having a storage device storing data corresponding to a checkpoint tag identification code; and
   at least one software application in a mobile processor device that configures the mobile processor device to receive a checkpoint schedule that includes a plurality of checkpoint locations at which the plurality of checkpoint tags are located, and to read each of the checkpoint tag located at one of the checkpoint locations when the mobile processor device is brought within a predefined vicinity of that checkpoint location, the checkpoint schedule including a plurality of actions to be carried out by a user of the mobile processor device or other person at the plurality of checkpoint locations in the checkpoint schedule in addition to reading the checkpoint tag at the plurality of checkpoint locations, including at least one of the actions to be carried out at each of the plurality of checkpoint locations;
   wherein the plurality of actions included in the schedule include one or more of checking an operation of a machine, checking a value of an indicator, meeting with a designated person at at least one of the checkpoint locations in the schedule, or recording image data or audio data, the image data corresponding to an image of or associated with one or more of the checkpoint locations in the checkpoint schedule, and the audio data corresponding to sounds at or associated with one or more of the checkpoint locations in the checkpoint schedule.

2. A checkpoint system as recited in claim 1, wherein the mobile processor device is configured to receive the checkpoint schedule from a backend processor over a wireless communication connection, and to read each checkpoint tag wirelessly over a further wireless communication connection.

3. A checkpoint system as recited in claim 1, wherein each checkpoint tag has a passive storage medium that stores the data corresponding to the checkpoint tag identification code, and wherein the passive storage medium of each checkpoint tag comprises at least one of a coded magnetic strip or an optically readable device.

4. A checkpoint system as recited in claim 1, wherein the at least one software application further configures the mobile processor to display on the mobile processor device, the at least one action from the plurality of actions in the checkpoint schedule to be carried out by the user at one of the checkpoint locations, in response to reading the checkpoint tag at that checkpoint location.

5. A checkpoint system as recited in claim 1, wherein the mobile processor device is associated with a designated person having a personnel identification code, and wherein the mobile processor device is further configured to read a personal identification code of the designated person at one or more checkpoint locations at which the mobile processor device reads a checkpoint tag.

6. A checkpoint system as recited in claim 1, further comprising:
an identification tag associated with a user of the mobile processor device, the identification tag having a storage medium that stores personnel identification code;
wherein the at least one software application further configures the mobile processor device to read the personnel identification code from the storage medium on the identification tag and transmit the personnel identification code to a further processor device at one or more of the checkpoint locations in the checkpoint schedule.

7. A checkpoint system as recited in claim 1, wherein the at least one software application further configures the mobile processor device to display on the mobile processor device, at each checkpoint location, the at least one action from the plurality of actions in the checkpoint schedule to be carried out by the user at that checkpoint location.

8. A checkpoint system as recited in claim 1 wherein the at least one software application further configures the mobile processor device to display a message on the mobile processor device, when a pre-defined time period has or is about to expire from a time of reading one of the checkpoint tags.

9. A checkpoint system as recited in claim 1, wherein the at least one software application further configures the mobile processor device to transmit data over a communication network, in response to the mobile processor device reading one of the checkpoint tags, and wherein the data transmitted over the communication network corresponds to user-input text data obtained through at least one user-input text interface device on the mobile processor device.

10. A checkpoint system as recited in claim 1, further comprising:
at least one backend or other processor device configured to receive and store information over a communication network;
wherein the at least one software application further configures the mobile processor device to transmit data over the communication network to the at least one backend or other processor device; and
wherein the data transmitted over the communication network corresponds to user-input text data obtained through at least one user-input text interface device on the mobile processor device.

11. A checkpoint system as recited in claim 1 wherein the at least one software application further configures the mobile processor device to transmit data over a communication network to at least one other processor device, in response to the mobile processor device failing to read one of the checkpoint tags at a time or within a time period for that checkpoint tag specified in the schedule received by the mobile processor device.

12. A checkpoint system as recited in claim 1, further comprising:
at least one backend or other processor device configured to process time and attendance information,
wherein the at least one software application further configures the mobile processor device to transmit data over a communication network to at least one backend or other processor device, in response to the mobile processor device receiving input corresponding to a work start time and/or a work stop time for the user of the mobile processor device;
wherein the at least one backend or other processor device is configured to employ the data as part of the time and attendance information to calculate payroll payment amounts or financial values or determine checkpoint schedules, based at least in part on the work start time and/or the work stop time.

13. A checkpoint system as recited in claim 8, wherein the message includes text to inform a user of the mobile processor device (a) that the person should be at the checkpoint location at which the next one of the checkpoint tags is located, or (b) of a particular time at which the user should be at the checkpoint location at which the next one of the checkpoint tags is located.

14. A checkpoint system as recited in claim 1, wherein the at least one software application further configures the mobile processor device to display start and stop operators that start and stop at least one timer associated with each of a work time period and a break time period, the start and stop operators being operable by a user of the mobile processor device.

15. A checkpoint system as recited in claim 14, wherein the at least one software application further configures the mobile processor device to display a message on the mobile processor device during the break time period to notify the user of the mobile processor device that the break time period is scheduled to end at a particular time, or is about to end or has already ended.

16. A checkpoint system as recited in claim 1, further comprising at least one timer for timing each of a work time period and a break time period, wherein the at least one timer for the work time period starts timing the work time period when an identification tag of a user of the mobile processor device is read.

17. A checkpoint system as recited in claim 16, wherein the at least one timer for the work time period stops timing the work time period when an identification tag of a user of the mobile processor device is read after the work time period has started.

18. A checkpoint system as recited in claim 16, wherein the at least one software application further configures the mobile processor device to communicate to a backend processor over a communication network, time information corresponding to the timing of each of the work time period and the break time period, wherein the backend processor is configured to calculate payroll payment amounts or financial values based at least in part on the time information, or determines checkpoint schedules based at least in part on the time information.

19. A checkpoint system as recited in claim 1, wherein each checkpoint tag comprises an active device configured for wireless communication with the mobile processor device, using a wireless fidelity (WiFi) or Bluetooth (BT) communication link.

20. A checkpoint system as recited in claim 1, wherein the at least one action included in the checkpoint schedule includes recording image data or audio data, the image data corresponding to an image of or associated with one or more of the checkpoint locations in the checkpoint schedule, and the audio data corresponding to sounds at or associated with one or more of the checkpoint locations in the checkpoint schedule.

21. The checkpoint system of claim 1, wherein the checkpoint schedule is received from one of the plurality of checkpoint tags.

22. A checkpoint process comprising:
locating a plurality of checkpoint tags at a plurality of different checkpoint locations, each checkpoint tag having a storage device storing data corresponding to a checkpoint tag identification code; and
configuring each mobile processor device of a plurality of mobile processor devices to receive a checkpoint schedule that includes a plurality of checkpoint locations at which the plurality of checkpoint tags are located, and to read each of the checkpoint tag located at one of the checkpoint locations when the mobile processor device is brought within a predefined vicinity of that checkpoint location, the checkpoint schedule including a plurality of actions to be carried out by a user of the mobile processor device or other person at the plurality of checkpoint locations in the checkpoint schedule in addition to reading the checkpoint tag at the plurality of checkpoint locations, including at least one of the actions to be carried out at each of the plurality of checkpoint locations;
wherein the plurality of actions included in the schedule includes one or more of checking an operation of a machine, checking a value of an indicator, meeting with a designated person at at least one of the checkpoint locations in the schedule, or recording image data or audio data, the image data corresponding to an image of or associated with one or more of the checkpoint locations in the checkpoint schedule, and the audio data corresponding to sounds at or associated with one or more of the checkpoint locations in the checkpoint schedule.

23. A process as recited in claim 22, wherein configuring each mobile processor device comprises configuring each mobile processor device to display, on the mobile processor device and in response to reading one of the checkpoint tags at one of the checkpoint locations, the at least one action from the plurality of actions in the checkpoint schedule received by the mobile processor device, the at least one action to be carried out by the user at the one checkpoint location.

24. A process as recited in claim 22, further comprising:
associating the plurality of mobile processor devices with a corresponding plurality of users;
associating a different personnel identification code with each of the users; and
reading the personnel identification code associated with the user of that mobile processor device each time the mobile processor device reads a checkpoint tag.

25. A process as recited in claim 24, further comprising:
associating a different identification tag with each different one of the users;
storing the personnel identification code assigned to one of the users on storage media in the identification tag associated with that user;
configuring the mobile processor devices to read the personnel identification codes from the storage media on one of the identification tags and transmit the personnel identification code to a further processor device each time the mobile processor device reads a checkpoint tag at a checkpoint location.

26. A process as recited in claim 22, further comprising:
transmitting data from at least one of the mobile processor devices over the communication network to at least one backend or other processor device, in response to the at least one mobile processor device reading one of the checkpoint tags;
wherein the data transmitted over the communication network corresponds to user-input text data obtained through at least one user-input text interface device on the mobile processor device.

27. A process as recited in claim 22, further comprising transmitting data from one of the mobile processor devices over a communication network to at least one other processor device, in response to the mobile processor device failing to read one of the checkpoint tags at a time or within a time period for that checkpoint tag specified in a schedule received by the mobile processor device.

28. A checkpoint system comprising:
a plurality of checkpoint tags, each checkpoint tag located at a different checkpoint location relative to each other checkpoint tag, each checkpoint tag having a storage device storing data corresponding to a checkpoint tag identification code;
at least one backend or other processor device configured to receive and store information over a communication network;
at least one mobile processor device configured to receive a schedule that includes a plurality of checkpoint locations at which the plurality of checkpoint tags are located, and to read each of the checkpoint tag located at one of the checkpoint locations when the mobile processor device is brought within a predefined vicinity of that checkpoint location, the checkpoint schedule including a plurality of actions to be carried out by a user of the mobile processor device or other person at at the plurality of checkpoint locations in the checkpoint schedule in addition to reading the checkpoint tag at the plurality of checkpoint locations, including at least one of the actions to be carried out at each of the plurality of checkpoint locations;
wherein the plurality of actions included in the schedule includes one or more of checking an operation of a machine, checking a value of an indicator, meeting with a designated person at at least one of the checkpoint locations in the schedule, or recording image data or audio data, the image data corresponding to an image of or associated with one or more of the checkpoint locations in the checkpoint schedule, and the audio data corresponding to sounds at or associated with one or more of the checkpoint locations in the checkpoint schedule;

wherein the mobile processor device is configured to transmit data over the communication network to the at least one backend or other processor device; and wherein the data transmitted over the communication network corresponds to at least one of: (a) the checkpoint tag identification code of the one checkpoint tag, (b) the location information, (c) a personnel identification code assigned to a person associated with the mobile processor device, (d) sensor data obtained from one or more sensors on the mobile processor device, (e) time information corresponding to a time at which the checkpoint tag is read, and (f) user-input data obtained through at least one user-input device on the mobile processor device.

29. A checkpoint system comprising at least one software application in a mobile processor device that configures the mobile processor device to receive a checkpoint schedule that includes a plurality of checkpoints in a region, and to communicate location information corresponding to a location of the mobile processor device when the mobile processor device is located within a predefined vicinity of each checkpoint location in the checkpoint schedule, and to read checkpoint tag located at each of the checkpoint locations, the checkpoint schedule including a plurality of actions to be carried out by a user of the mobile processor device or other person at the plurality of checkpoint locations in the checkpoint schedule, in addition to reading the checkpoint tag at the plurality of checkpoint locations, including at least one of the actions to be carried out at each of the plurality of checkpoint locations, wherein the plurality of actions included in the schedule includes one or more of checking an operation of a machine, checking a value of an indicator, meeting with a designated person at at least one of the checkpoint locations in the schedule, or recording image data or audio data, the image data corresponding to an image of or associated with one or more of the checkpoint locations in the checkpoint schedule, and the audio data corresponding to sounds at or associated with one or more of the checkpoint locations in the checkpoint schedule.

30. A checkpoint system as recited in claim 29, wherein the at least one action included in the checkpoint schedule includes checking an operation of a machine, checking a value of an indicator, or meeting with a designated person at least one of the checkpoint locations in the schedule.

* * * * *